(12) United States Patent
Iwata

(10) Patent No.: US 12,022,198 B2
(45) Date of Patent: Jun. 25, 2024

(54) CONTROL APPARATUS, IMAGE PICKUP APPARATUS, CONTROL METHOD, AND MEMORY MEDIUM

(71) Applicant: CANON KABUSHIKI KAISHA, Tokyo (JP)

(72) Inventor: Sairi Iwata, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 130 days.

(21) Appl. No.: 17/308,633

(22) Filed: May 5, 2021

(65) Prior Publication Data

US 2021/0360162 A1 Nov. 18, 2021

(30) Foreign Application Priority Data

May 13, 2020 (JP) .................................. 2020-084267
Oct. 8, 2020 (JP) .................................. 2020-170291

(51) Int. Cl.
*H04N 23/69* (2023.01)
*H04N 23/62* (2023.01)
*H04N 23/667* (2023.01)
*H04N 23/695* (2023.01)

(52) U.S. Cl.
CPC ........... *H04N 23/695* (2023.01); *H04N 23/62* (2023.01); *H04N 23/667* (2023.01)

(58) Field of Classification Search
USPC ........................................................ 348/169
See application file for complete search history.

(56) References Cited

U.S. PATENT DOCUMENTS

| | | | | |
|---|---|---|---|---|
| 6,313,564 | B1* | 11/2001 | Kataoka | H02N 2/14 310/316.01 |
| 7,192,119 | B2* | 3/2007 | Silverbrook | B41J 2/14 347/65 |
| 7,225,739 | B2* | 6/2007 | Silverbrook | B41J 15/042 101/424.1 |
| 10,456,694 | B1* | 10/2019 | Smoot | E04B 5/43 |
| 2005/0254805 | A1* | 11/2005 | Moriya | H04N 23/68 396/53 |
| 2006/0176366 | A1* | 8/2006 | Moriya | H04N 23/68 348/E5.046 |
| 2006/0176372 | A1* | 8/2006 | Moriya | G03B 17/00 348/208.4 |
| 2007/0058972 | A1* | 3/2007 | Misawa | H04N 23/55 348/E5.026 |
| 2007/0115351 | A1* | 5/2007 | McCormack | H04N 23/698 348/E5.042 |
| 2009/0059058 | A1* | 3/2009 | Okabe | H04N 23/634 348/E5.042 |

(Continued)

FOREIGN PATENT DOCUMENTS

JP 2010-038942 A 2/2010
JP 2017-060279 A 3/2017

*Primary Examiner* — Nigar Chowdhury
(74) *Attorney, Agent, or Firm* — CANON U.S.A., INC. IP Division

(57) ABSTRACT

An apparatus includes a control unit configured to control driving of a movable unit, a determination unit configured to determine a state in which the movable unit is pressed or twisted, and a decision unit configured to set the control unit to a first stop mode if the movable unit is in a pressed state, and to set the control unit to a second stop mode if the movable unit is in a twisted state.

9 Claims, 19 Drawing Sheets

(56) References Cited

U.S. PATENT DOCUMENTS

| | | | |
|---|---|---|---|
| 2009/0154911 A1* | 6/2009 | Shibata | H04N 23/6812 348/208.4 |
| 2009/0180769 A1* | 7/2009 | Mizuta | G03B 17/00 396/55 |
| 2010/0110203 A1* | 5/2010 | Noguchi | G03B 17/00 348/208.4 |
| 2011/0102609 A1* | 5/2011 | Iwata | G03B 5/00 348/208.4 |
| 2011/0158620 A1* | 6/2011 | Kanayama | G03B 5/00 396/55 |
| 2011/0190595 A1* | 8/2011 | Bennett | A61B 1/05 600/300 |
| 2011/0293245 A1* | 12/2011 | Kudo | G11B 27/105 386/248 |
| 2012/0063756 A1* | 3/2012 | Kang | H04N 23/687 396/55 |
| 2012/0229651 A1* | 9/2012 | Takizawa | H04N 23/611 348/169 |
| 2013/0093896 A1* | 4/2013 | Jeon | G08B 13/19697 348/152 |
| 2013/0155175 A1* | 6/2013 | Mock | H04N 7/15 348/14.05 |
| 2014/0300693 A1* | 10/2014 | Hirata | G03B 37/02 348/39 |
| 2015/0103234 A1* | 4/2015 | Takei | H02N 2/062 318/600 |
| 2017/0163899 A1* | 6/2017 | Irie | H04N 23/632 |
| 2018/0184004 A1* | 6/2018 | Murakami | H04N 23/67 |
| 2018/0335850 A1* | 11/2018 | Yamazaki | G06F 1/1684 |
| 2019/0094566 A1* | 3/2019 | Kimura | H04N 23/663 |
| 2019/0132532 A1* | 5/2019 | Tabuchi | H04N 25/61 |
| 2019/0224565 A1* | 7/2019 | Yamano | A63F 13/23 |
| 2019/0331875 A1* | 10/2019 | Ikeda | G02B 7/09 |
| 2019/0335078 A1* | 10/2019 | Chen | H04N 23/73 |
| 2020/0233010 A1* | 7/2020 | Takizawa | G01C 19/5747 |
| 2020/0329199 A1* | 10/2020 | Nomura | H04N 23/687 |
| 2020/0406128 A1* | 12/2020 | Nakagawa | A63F 13/285 |
| 2021/0165183 A1* | 6/2021 | Kameyama | H04N 23/58 |

* cited by examiner

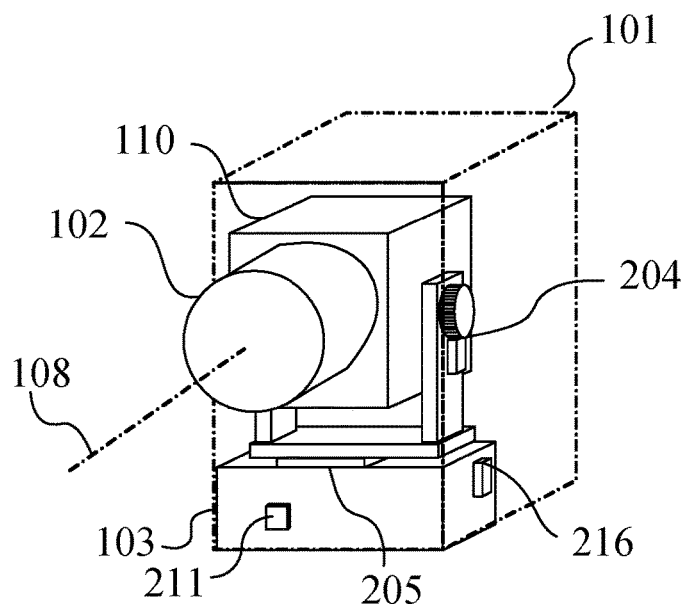
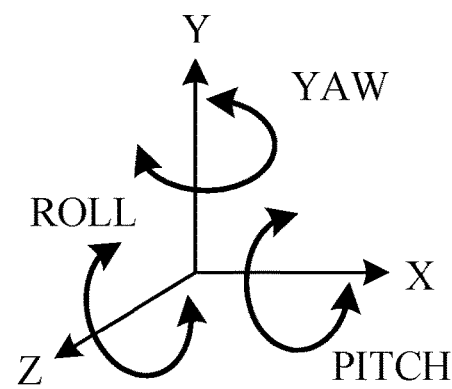
FIG. 1A  FIG. 1B
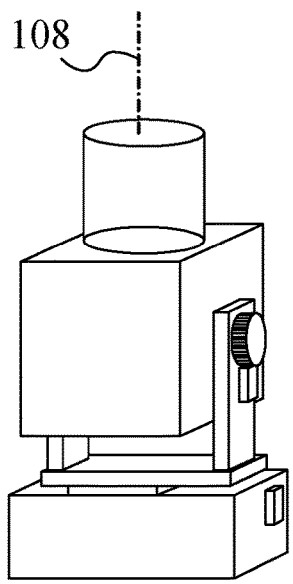
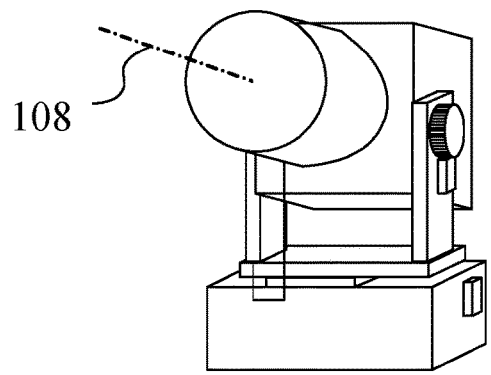
FIG. 1C  FIG. 1D

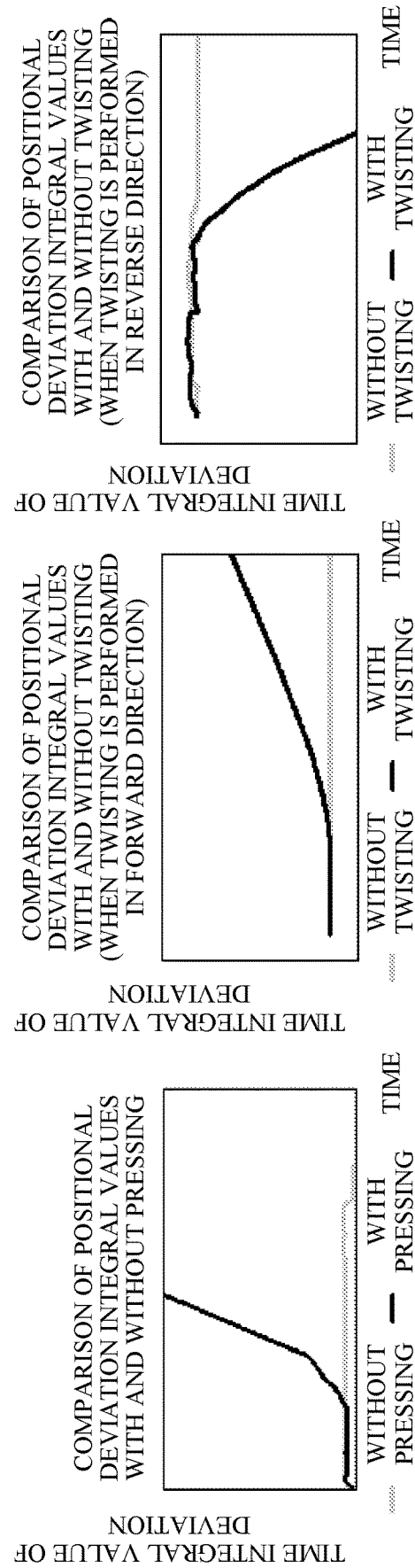

CONTROL APPARATUS, IMAGE PICKUP APPARATUS, CONTROL METHOD, AND MEMORY MEDIUM

BACKGROUND OF THE DISCLOSURE

Field of the Disclosure

The aspect of the embodiments relates to a control apparatus that controls a panning mechanism and a tilting mechanism.

Description of the Related Art

Conventionally, an image pickup apparatus has been known that drives a panning mechanism and a tilting mechanism to search for and track an object. If such an image pickup apparatus does not have an exterior such as a cover around a movable unit of each of the panning mechanism and the tilting mechanism, a user can touch the movable unit. Therefore, a part of an object or user's body may touch the movable unit moving during, for example, initialization operation including panning driving and tilting driving at a time of startup of the image pickup apparatus, search for an image pickup object, or tracking operation. Further, the user may intentionally press the moving movable unit by hand or the like (hereinafter also referred to as "perform pressing operation") or forcibly move the movable unit (hereinafter also referred to as "perform twisting operation").

Japanese Patent Application Laid-Open No. ("JP") 2017-60279 discloses a control method for controlling a vibration actuator by switching between a first driving mode and a second driving mode based on a difference between a target position and a current position. Here, the first driving mode is a mode in which a plurality of vibration actuators perform spheroidal motion, and the second driving mode is a mode in which one vibration actuator of a plurality of vibrator performs spheroidal motion and the other vibration actuators perform linear motion in a direction of pressurization.

However, in the image pickup apparatus disclosed in JP 2017-60279, when the pressing operation or the twisting operation occurs, image pickup is not properly carried out in the image pickup apparatus, because the operation of the movable unit is hindered, the operation unit having been driven based on an image pickup instruction. Moreover, a load is applied to an actuator, such as the vibration actuator, for driving the movable unit.

SUMMARY OF THE DISCLOSURE

An apparatus according to one aspect of the embodiments includes a control unit configured to control driving of a movable unit, a determination unit configured to determine a state in which the movable unit is pressed or twisted, and a decision unit configured to set the control unit to a first stop mode if the movable unit is in a pressed state, and to set the control unit to a second stop mode if the movable unit is in a twisted state.

An apparatus according to one aspect of the embodiments includes a control unit configured to control driving of a movable unit, a first decision unit configured to determine a target position of the movable unit, a first determination unit configured to determine a control state of the movable unit based on whether or not a control amount of the control unit is within a predetermined range, the control amount being calculated based on the target position and a current position of the movable unit, a second determination unit configured to determine whether or not a current velocity of the movable unit is larger than a threshold value, if the control amount is not within the predetermined range, and a second decision unit configured to set the control unit to a first stop mode if the current velocity is larger than the threshold value, and to set the control unit to a second stop mode if the current velocity is not larger than the threshold value.

Image pickup apparatuses respectively including the above control apparatuses also constitute other aspects of the embodiments.

A method according to one aspect of the embodiments includes controlling driving of a movable unit, determining a state in which the movable unit is pressed or twisted, and setting control during the controlling driving to a first stop mode if the movable unit is in a pressed state, and setting the control during the controlling driving to a second stop mode if the movable unit is in a twisted state.

A non-transitory computer-readable storage medium storing a computer program that causes a computer to execute the above method also constitute another aspect of the embodiments.

A method according to one aspect of the embodiments includes controlling driving of a movable unit, determining a target position of the movable unit, determining a control state of the movable unit based on whether or not a control amount during the controlling driving is within a predetermined range, the control amount being calculated based on the target position and a current position of the movable unit, determining whether or not a current velocity of the movable unit is larger than a threshold value, if the control amount is not within the predetermined range, and setting control during the controlling driving to a first stop mode if the current velocity is larger than the threshold value, and setting the control during the controlling driving to a second stop mode if the current velocity is not larger than the threshold value.

Further features of the disclosure will become apparent from the following description of exemplary embodiments with reference to the attached drawings.

BRIEF DESCRIPTION OF THE DRAWINGS

FIGS. 1A to 1D are diagrams each illustrating an image pickup apparatus according to first to third embodiments.

FIGS. 7A to 7C are graphs each describing a temporal change in an integral value of a positional deviation during pressing/twisting operation according to the first embodiment.

DESCRIPTION OF THE EMBODIMENTS

Figure 2:
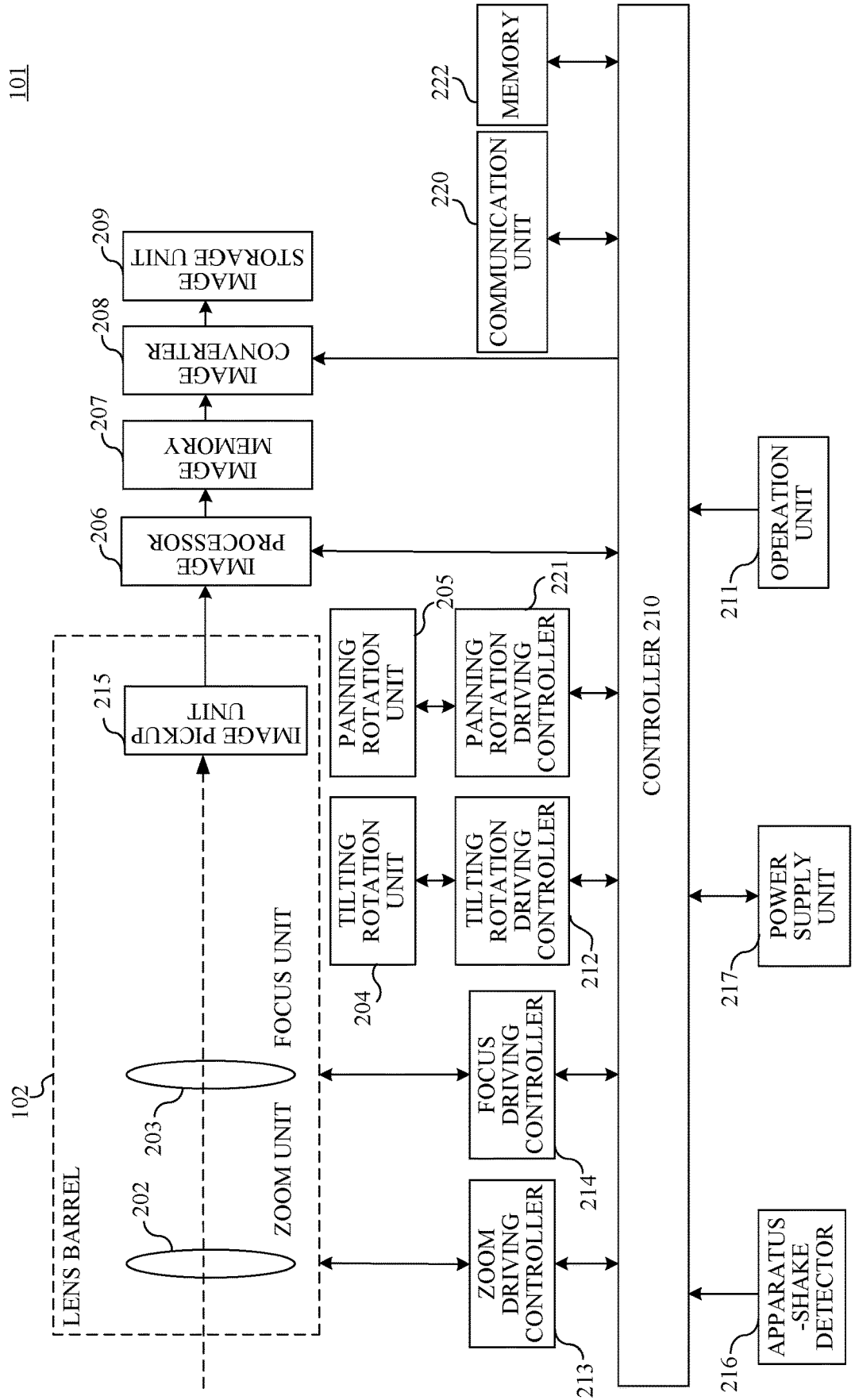
FIG. 2 is a block diagram illustrating the image pickup apparatus according to the first embodiment.

Referring now to the accompanying drawings, a description will be given of embodiments according to the disclosure.

First, a description will be given of an external view of a camera 101 which is an image pickup apparatus with reference to FIGS. 1A to 1D. FIGS. 1A to 1D are diagrams each illustrating the camera 101. FIG. 1A is an external perspective view illustrating the camera 101. As illustrated in FIG. 1A, the camera 101 includes an operation member, such as a power switch, with which the camera can be operated and which is included in an operation unit 211. The camera 101 includes a lens barrel 102, a movable unit 110, and a fixed unit 103. A tilting rotation unit 204 and a panning rotation unit 205 are disposed in the movable unit 110 connected to the barrel 102, and are movable units each of which can be rotationally driven with respect to the fixed unit 103 by a tilting rotation driving controller 212 and a panning rotation driving controller 221. The tilting rotation unit 204 is configured to rotate the barrel 102 in a pitch direction in FIG. 1B, which will be also referred to as a vertical direction or a second direction different from a first direction, hereinafter. Thereby, the barrel 102 can change a direction of an optical axis 108 of an image pickup optical system from a direction illustrated in FIG. 1A to directions illustrated in FIGS. 1C and 1D. The panning rotation unit 205 is configured to rotate the barrel 102 in a yaw direction in FIG. 1B, which will be also referred to as a horizontal direction or the first direction, hereinafter. FIG. 1B illustrates definitions of axes at the position of the fixed unit 103. A shake detector (angular velocity sensor) 216 is included in the fixed unit 103 of the camera 101.

First Embodiment

Next, a description will be given of an internal configuration of the camera 101 according to the first embodiment with reference to FIG. 2.

FIG. 2 is a block diagram illustrating the camera 101. A reference numeral 102 denotes the lens barrel. A reference numeral 202 denotes a zoom unit which includes a zoom lens for magnification variation in an angle of view. A reference numeral 213 denotes a zoom driving controller configured to drive the zoom unit 202. A reference numeral 203 denotes a focus unit which includes a focus lens for focusing. A reference numeral 214 denotes a focus driving controller configured to perform driving control on the focus unit 203.

An image pickup unit 215 includes an image sensor such as a CMOS sensor or a CCD sensor, and is configured to receive light entering through each lens unit included in the image pickup optical system, and to output, as analog image data, charge information based on an amount of the light to an image processor 206. The image processor 206 is configured perform image processing such as distortion correction, white balance adjustment, and color interpolation processing on digital image data which is acquired as output of A/D conversion, and to output the digital image data after the processing. The image processor is further configured to convert the digital image data into a video signal (image signal) which is compliant with a format such as NTSC or PAL, and to supply the image signal to an image memory 207. An image converter 208 is configured to output the image signal stored in the image memory 207 based on an image conversion amount calculated by the controller 210, and to store the output image signal in a recording medium such as a non-volatile memory in an image storage unit 209.

The lens barrel 102 is driven in a tilting direction and a panning direction by the tilting rotation driving controller 212 configured to drive the tilting rotation unit 204 and the panning rotation driving controller 221 configured to drive the panning rotation unit 205, respectively.

An apparatus-shake detector 216 includes, for example, an angular velocity sensor, i.e., a gyro sensor, configured to detect an angular velocity in three axes directions of the camera 101. A power supply unit 217 is configured to supply power to the camera 101. The operation unit 211 for a user to give an instruction to the controller 210 of the image pickup apparatus has a power button and a button with which a setting of the camera 101 can be changed. When the power button is operated, the power supply unit 217 supplies power to the entire system based on an intended use, and the camera 101 is started up.

The controller 210 as a control apparatus for controlling the entire system of the camera 101 is configured to execute an automatic image pickup program, a pressing/twisting determination program, a pressing/twisting end determination program, and a recovery operation determination program, each of which is a computer program stored in the memory 222.

The communication unit 220 for performing communication between the camera 101 and an external apparatus is configured to transmit or receive data such as an audio signal and an image signal. The communication unit 220 is also configured to receive control signals relating to image pickup, such as image pickup start/end command and a control signal for pan, tilt or zoom driving, and to drive the camera 101 based on the instruction from the external apparatus. The communication unit 220 is a wireless communication module such as an infrared communication module, a Bluetooth communication module, a wireless LAN communication module, a wireless USB, a GPS receiver, and the like.

Figure 3:
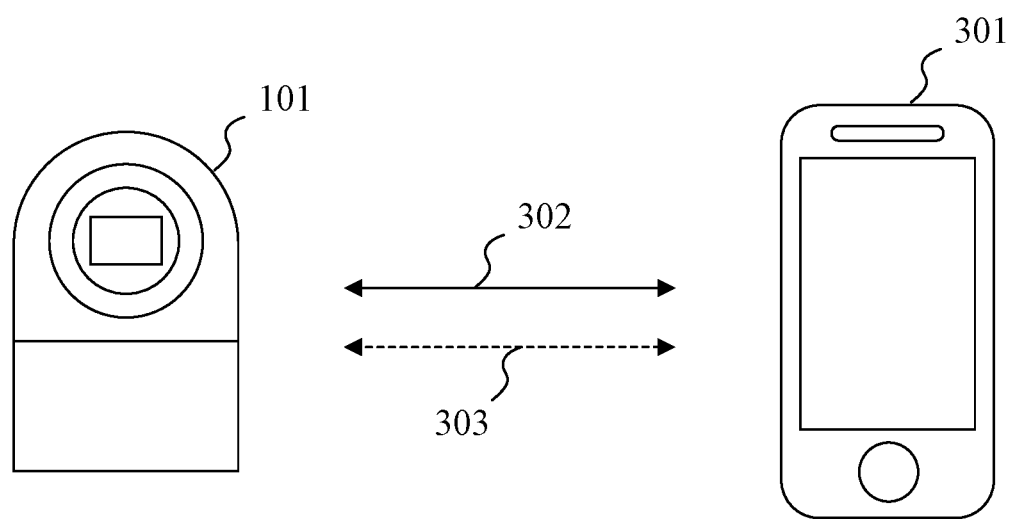
FIG. 3 is an explanatory diagram illustrating wireless communication between the image pickup apparatus and an external apparatus according to the first embodiment.

Next, a configuration example will be described of a wireless communication system of the camera 101, which is the image pickup apparatus, and an external apparatus 301 with reference to FIG. 3. FIG. 3 is an explanatory diagram of wireless communication between the camera 101 and the external apparatus 301. The camera 101 is a digital camera having an image pickup function, and the external apparatus 301 is a smart device including a Bluetooth communication module, a wireless LAN communication module, and the like.

The camera 101 and the external apparatus 301 communicate with each other by, for example, communication 302 via wireless LAN which is compliant with the IEEE 802.11 standard series and by communication 303 having a master-slave relationship between a control station and a subordinate station such as Bluetooth Low Energy (BLE). The wireless LAN and BLE are examples for communication methods, and another communication method may be used as long as each apparatus has two or more communication functions and a communication function of one side can be controlled by a communication function of the other side that performs, for example, communication in a relationship between a control station and a subordinate station. Here, without losing generality, first communication such as wireless LAN can perform faster communication than second communication such as BLE, and the second communication consumes less power or has a shorter communicable distance than the first communication.

Figure 4:
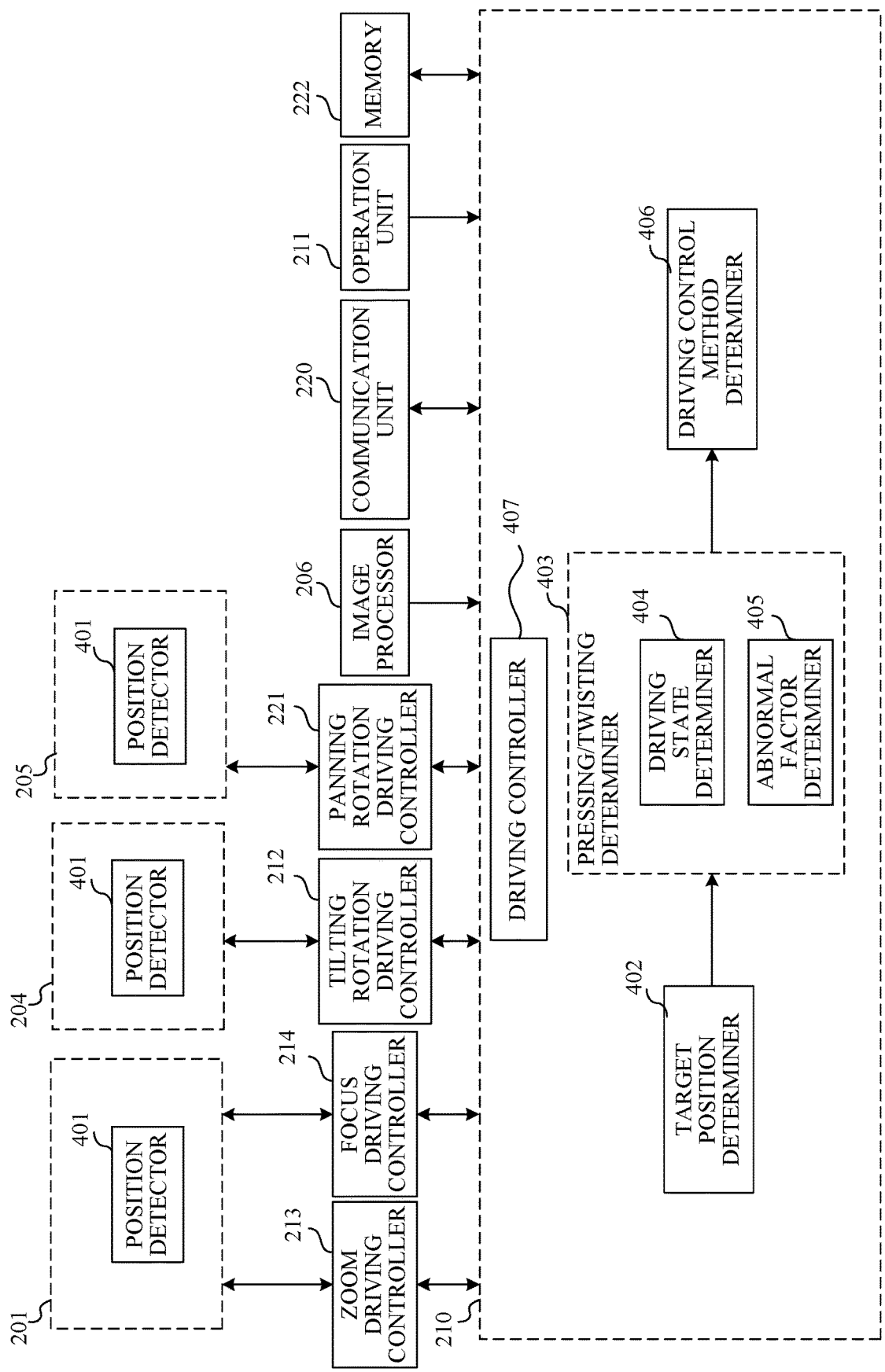
FIG. 4 is a block diagram illustrating a main part of the image pickup apparatus according to the first embodiment.

Next, the configuration of the main part of the camera 101 will be described with reference to FIG. 4. FIG. 4 is a block diagram illustrating a main part of the camera 101, and in particular, illustrating a configuration example of the controller 210 that realizes a pressing/twisting detection function in the first embodiment. The controller 210 includes a target position determiner (first decision unit) 402, a pressing/twisting determiner (determination unit) 403, a driving control method determiner (decision unit or second decision unit) 406, and a driving controller (driving control unit) 407. The target position determiner 402 is configured to determine each target position when each of the panning rotation unit 205 and the tilting rotation unit 204 are driven. Information for determining the target position can be acquired from the image processor 206, the communication unit 220, the operation unit 211, or the like.

First, a description will be given of a method of determining the target position based on information acquired from the image processor 206. The image processor 206 is an object detection unit that detects an object (object information) based on image information obtained from the image pickup unit 215. The object is detected by face detection processing or the like and is determined as an image pickup target. The determined object information is transmitted to the controller 210. Here, if the object or the user holding the camera 101 moves in a horizontal direction, the object may be lost from the angle of view. In order to continue capturing the object, the controller 210 is to drive the panning rotation unit 205 and the tilting rotation unit 204 to change the position of each unit. At that time, the target position determiner 402 determines the target positions of the panning rotation unit 205 and the tilting rotation unit 204, respectively, based on information such as size and position of the object on the image information.

Next, a description will be given of a method of determining the target position based on information acquired from the communication unit 220. The communication unit 220 determines, as an image pickup target, a person or an object designated by the user via input from a touch panel, a button, or the like on the external apparatus 301. Based on the information acquired from the communication unit 220, the target position determiner 402 determines the target position to which the panning rotation unit 205 and the tilting rotation unit 204 is driven so as to continue capturing the object. Alternatively, the target position determiner 402 determines the target position based on a signal including the driving of the panning rotation unit 205 and the tilting rotation unit 204 where the signal is input by the user operation on the external apparatus 301.

A description will be given of a method of determining the target position based on information acquired from the operation unit 211. From the operation unit 211, an amount of operation on the operation member, such as a button and a control wheel, is transmitted to controller 210 as an input signal. The target position determiner 402 determines the target position based on the input signal. If there is no image pickup target, the controller 210 drives the panning rotation unit 205 and the tilting rotation unit 204 to change the direction of the barrel 102 and search for an object. In that case, driving is performed while a predetermined position is set as the target position.

Feedback control is performed such that the deviation between the target position and the current position is reduced or eliminated, so that each of the panning rotation unit 205 and the tilting rotation unit 204 are driven and made to reach the target position. Therefore, each of the tilting rotation unit 204 and the panning rotation unit 205 includes a position detector 401. Each position detector 401 is configured to include an encoder and the like.

Subsequently, the pressing/twisting determiner 403 determines whether or not the pressing/twisting has been performed, by using information on the target position determined by the target position determiner 402 and information on the current position detected by the position detector 401. The pressing/twisting determiner 403 includes a driving state determiner (first determination unit) 404 and an abnormal factor determiner (second determination unit) 405. The driving state determiner 404 determines whether or not the driving is properly performed, based on the information on the target position and the current position of each of the panning rotation unit 205 and the tilting rotation unit 204. A description will be given later of the detailed processing in the driving state determiner 404. If the driving state determiner 404 determines that the driving is not properly performed, the abnormal factor determiner 405 determines whether a factor that hinders proper driving is pressing or twisting, for a subjected unit based on the current position information.

Based on a determination result from the pressing/twisting determiner 403, the driving control method determiner 406 makes determination on switching in the actuator of the rotation unit from the driving state to one of a plurality of stop modes, from the stop mode to the driving state, or the like. Each rotation driving controller executes driving control based on the driving control method determined by the driving control method determiner 406, and switches the driving method in the actuator of each rotation unit.

Figure 5:
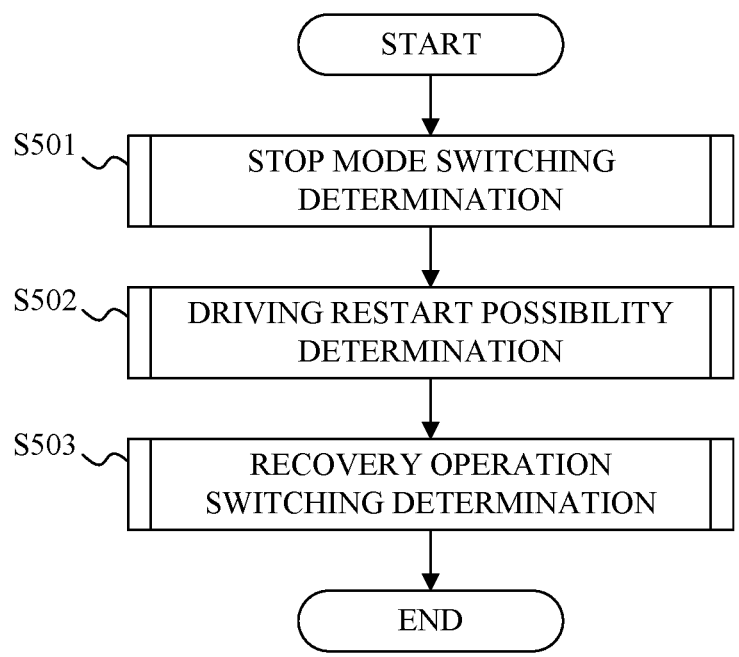
FIG. 5 is a flowchart illustrating pressing/twisting detection processing according to the first embodiment.

Next, a description will be given of a flow of pressing/twisting detection processing with reference to FIG. 5. FIG. 5 is a flowchart illustrating the pressing/twisting detection processing. Each step in FIG. 5 is mainly executed by the pressing/twisting determiner 403, the driving control method determiner 406, or the driving controller 407 of the controller 210.

When this processing starts, first, in step S501, the pressing/twisting determiner 403 makes a stop mode switching determination based on the driving state of the movable unit. If the pressing or twisting operation is performed in step S501, the controller 210 stops driving the movable unit and switches to one of two stop modes described later. Subsequently, in step S502, the pressing/twisting determiner 403 detects that the pressing or twisting operation has ended by determination on possibility of restoration of normal driving, and determines whether or not the driving can be restarted, that is, makes driving restart possibility determination. If any of the operations has ended, it is determined in step S502 that the driving can be restarted. In step S503, the pressing/twisting determiner 403 performs switching determination processing for recovery operation at the time when the driving restarts. In the first embodiment, firstly, a description will be given of processing for switching the stop mode of the actuator if the movable unit is not properly driven, in the stop mode switching determination in step S501. The first embodiment will describe operation of the panning rotation unit 205 as the movable unit.

Figure 6:
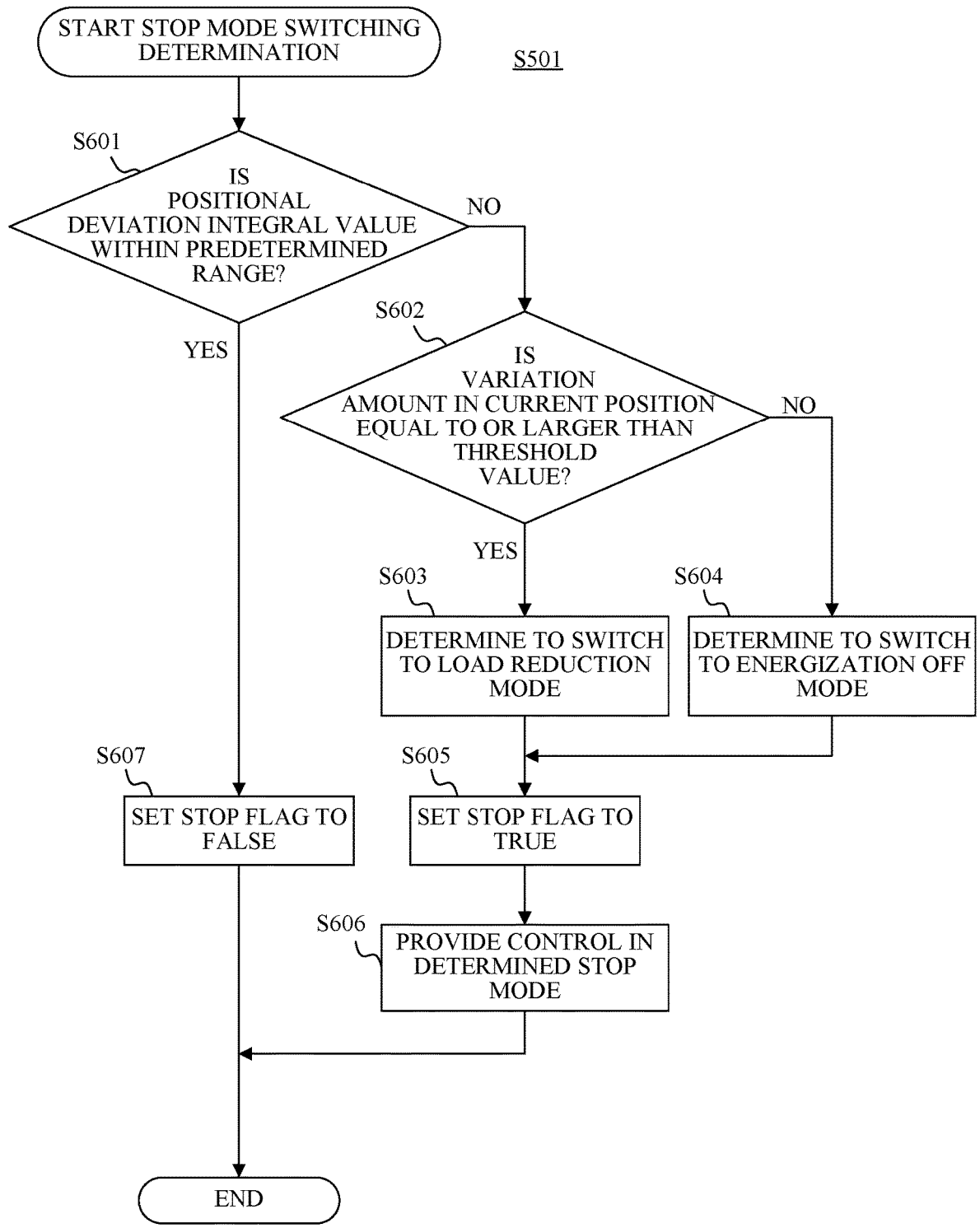
FIG. 6 is a flowchart illustrating stop mode switching determination processing according to the first embodiment.

The stop mode switching determination processing in step S501 will be described with reference to FIG. 6. FIG. 6 is a flowchart illustrating the stop mode switching determination processing. First, the pressing/twisting determiner 403 clears a stop flag for remembering whether or not the stop mode described later has been set at the start of processing or at the time of startup initialization. Subsequently, in step S601, the driving state determiner 404 calculates a time integral value of a deviation between the current position and the target position of the panning rotation unit 205, and determines whether an absolute value of the integral value (hereinafter also referred to as "positional deviation integral value") is within a predetermined range.

Here, with reference to FIGS. 7A to 7C, a description will be given of the change over time in the integral value of the positional deviation during the pressing/twisting operation. FIGS. 7A to 7C is a graph illustrating the change over time in the integral value of the positional deviation during pressing/twisting operation. FIG. 7A is a comparison diagram illustrating the positional deviation integral values of cases with and without pressing. In FIG. 7A, a black line represents a case where the pressing is performed and a gray line represents a case where the pressing is not performed. FIG. 7B is a comparison diagram illustrating the positional deviation integral values of cases with and without twisting in a forward direction. In FIG. 7B, a black line represents a case where the twisting is performed, and a gray line represents a case where the twisting is not performed. FIG. 7C is a comparison diagram illustrating the positional deviation integral values with and without twisting in a reverse direction. In FIG. 7C, a black line represents a case where the twisting is performed, and a gray line represents a case where the twisting is performed. In each of FIGS. 7A to 7C, a horizontal axis represents time and a vertical axis represents an integral value, that is a time integral value of deviation.

As represented by the gray line in each of FIGS. 7A to 7C, when pressing or twisting is not performed, i.e., when the movable unit is properly driving, the deviation between the target position and the current position disappears within a predetermined time. Therefore, the integral value of the deviation does not sharply increase or decrease and falls within a predetermined range. If the absolute value of the integral value of the positional deviation is within the predetermined range in step S601, the driving state determiner 404 determines that pressing operation or twisting operation has not been performed on the movable unit, and does not switch the driving mode to the stop mode, and the process proceeds to step S607. In step S607, the driving state determiner 404 sets the stop flag to FALSE and this processing ends. On the other hand, if the absolute value of the integral value of the positional deviation is not within the predetermined range in step S601, the driving state determiner 404 determines that pressing operation or the twisting operation has been performed on the movable unit, and the process proceeds to step S602.

In step S602, the abnormal factor determiner 405 determines whether the factor making the driving state abnormal is pressing operation or twisting operation. That is, the abnormal factor determiner 405 determines whether or not a variation amount in the current position, that is velocity, is equal to or larger than a threshold value, i.e., a predetermined amount. If pressing operation is performed, the variation amount in the current position per unit time, i.e., the velocity, of the panning rotation unit 205 becomes smaller than the predetermined amount. On the other hand, if twisting operation is performed, the velocity of the panning rotation unit 205 increases. Thus, if the velocity, that is the variation amount in the current position, is smaller than the predetermined amount, the abnormal factor determiner 405 determines that the pressing operation is being performed, i.e., the state is a pressed state, and the process proceeds to step S604. On the other hand, if the velocity is equal to or larger than the predetermined amount, the abnormal factor determiner 405 determines that the twisting operation is being performed, i.e., the state is a twisted state, and the process proceeds to step S603.

The driving control method determiner 406 makes determination on switching from the driving state to one of the stop modes, based on the determination result from the pressing/twisting determiner 403. If it has been determined in step S602 that the state is the twisting state, the driving control method determiner 406 determines in step S603 to switch the stop mode of the actuator to a load reduction mode as a first stop mode, which will be described later. If it has been determined in step S602 that the state is in the pressed state, the driving control method determiner 406 determines in step S604 to stop driving the actuator, i.e., to switch the stop mode to an energization off mode as a second stop mode.

After the processing in step S603 or step S604 ends, the process proceeds to step S605. In step S605, the driving control method determiner 406 sets the stop flag to TRUE and the process proceeds to step S606. In step S606, the driving controller 407 transmits, to the panning rotation driving controller 221, a control instruction based on the stop mode, that is the load reduction mode or the energization off mode, which is determined by the driving control method determiner 406. Thereafter, the panning rotation unit 205 stops in either the load reduction mode (first stop mode) or the energization off mode (second stop mode).

Figure 8A:
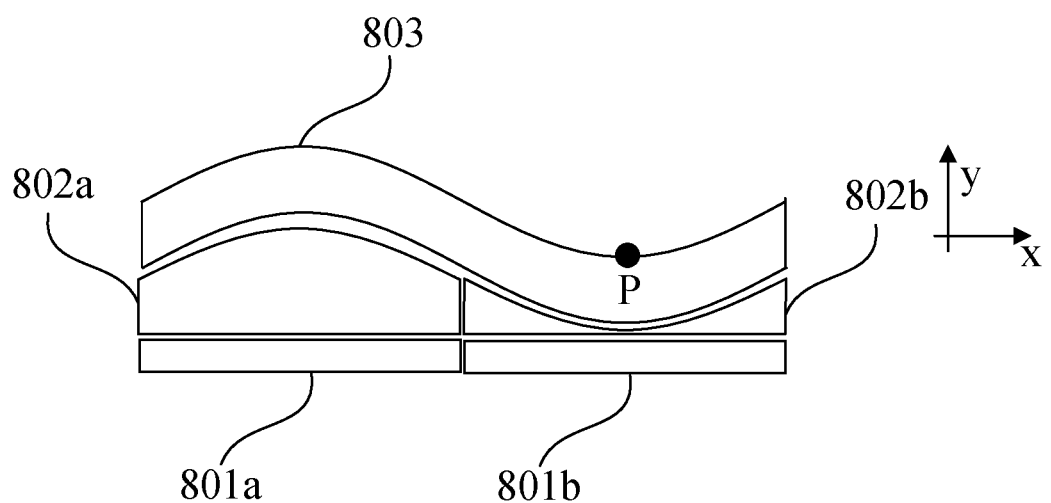
FIGS. 8A to 8C are diagrams each illustrating a driving mode of a vibration actuator according to the first embodiment.
Figure 8B:
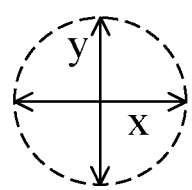
Figure 8C:
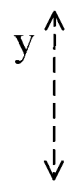

Here, with reference to FIGS. 8A to 8C, a description will be given of the driving methods and the two stop modes which are switched by the driving control method determiner 406 while a vibration actuator is used as an example. Each of FIGS. 8A to 8C is a diagram illustrating the vibration actuator in the driving mode. FIG. 8A is a sectional view illustrating the vibration actuator for driving the panning rotation unit 205. In coordinate axes in each of FIGS. 8A to 8C, an x axis is the moving direction, which is also referred to as a "feeding direction" hereinafter, and a y axis is a direction orthogonal to the moving direction, which is also referred to as a "push-up direction" hereinafter.

Reference numerals 801a and 801b denote electrodes, and reference numerals 802a and 802b denote piezoelectric elements, respectively. Reference numeral 803 denotes a stator. When the panning rotation unit 205 and the tilting rotation unit 204 are driven in the x axis direction, two phases of cyclic voltage waveforms having different phases are applied to the electrodes 801a and 801b, respectively. When the cyclic voltage waveform is applied to the electrodes 801, an inverse piezoelectric effect causes the piezoelectric elements 802a and 802b to expand and contract, and two types of standing waves are generated in the stator 803. By combining the two types of standing waves, substantially spheroidal motion is generated at a contact portion between the stator 803 and the rotation portion. Normally, when the vibration actuator is driven toward the target position, the vibration actuator is driven by the above method. FIG. 8B illustrates a trajectory of spheroidal vibration generated at a point P in FIG. 8A.

If the movable unit is pressed by hand or the like, the absolute value of the integral value of the positional deviation becomes large, a thrust is increased so that the movable unit is driven and made to reach the target position. As a result, the spheroidal motion is repeated with the current value flowing through the vibration actuator increased. During the pressing operation, the driving is stopped by setting the mode to the energization off mode in which the energization to the vibration actuator is stopped. Thereby, it is possible to prevent the vibration actuator from deteriorating and to prevent power consumption.

The load reduction mode is a mode in which the vibration actuator performs substantially linear motion in the y axis direction as illustrated in FIG. 8C, by cyclic voltage waveforms having the same phase applied to the electrodes 801a and 801b. Since the load reduction mode causes the linear motion in the push-up direction, the load reduction mode cannot cause traveling in the x axis direction, but can reduce friction between the vibration actuator and a member contacting the vibration actuator. During the twisting operation, the mode is switched to the load reduction driving mode instead of the energization off mode. Thereby, it is possible to reduce the load and to prevent the actuator from deteriorating.

The external apparatus 301 can output a message and notify the user of the state of the camera 101 based on signal information which indicates a state of the camera 101 and is received via the communication unit 220. If the pressing/twisting determiner 403 determines that the camera 101 is in the pressed state or the twisted state, the external apparatus 301 can notify the user that the camera 101 is in the pressed/twisted state.

In the first embodiment, the driving state determiner 404 determines whether or not the driving is properly performed, by using the integral value of the positional deviation between the target position and the current position, i.e., by using a control amount, but may make the determination by using other different parameters. For example, the determination may be made not only by using the integral value of the positional deviation between the target position and the current position, but also by using the value including the differential value of the positional deviation. Further, the control amount in the feedback control or the like may be used. Alternatively, the determination may be made by using a driving current value. If the movable unit is properly driven, a rated current is flowing, but if the pressing/twisting operation is performed, the current exceeding the rated current flows. In such a case, a threshold value may be set for the current value, and the determination may be made depending on whether or not the current value is equal to or larger than the threshold value.

In the first embodiment, the description has been given of the case where the pressing/twisting operation is performed when the movable unit is being driven toward the target position, but the disclosure can be applied also when the driving of the movable unit is stopped. When the driving of the movable unit is stopped, if pressing operation is performed, it is determined in step S601 that the absolute value of the integral value of the positional deviation is within the predetermined range, and thus the pressing operation cannot be detected. On the other hand, if twisting operation is performed, it is determined in step S601 that the absolute value of the integral value of the positional deviation is not within the predetermined range, and determined in step S602 that the velocity is equal to or larger than the threshold value, and thus the twisting operation can be detected. In this case, the driving is similarly performed in the load reduction driving mode.

Figure 9:
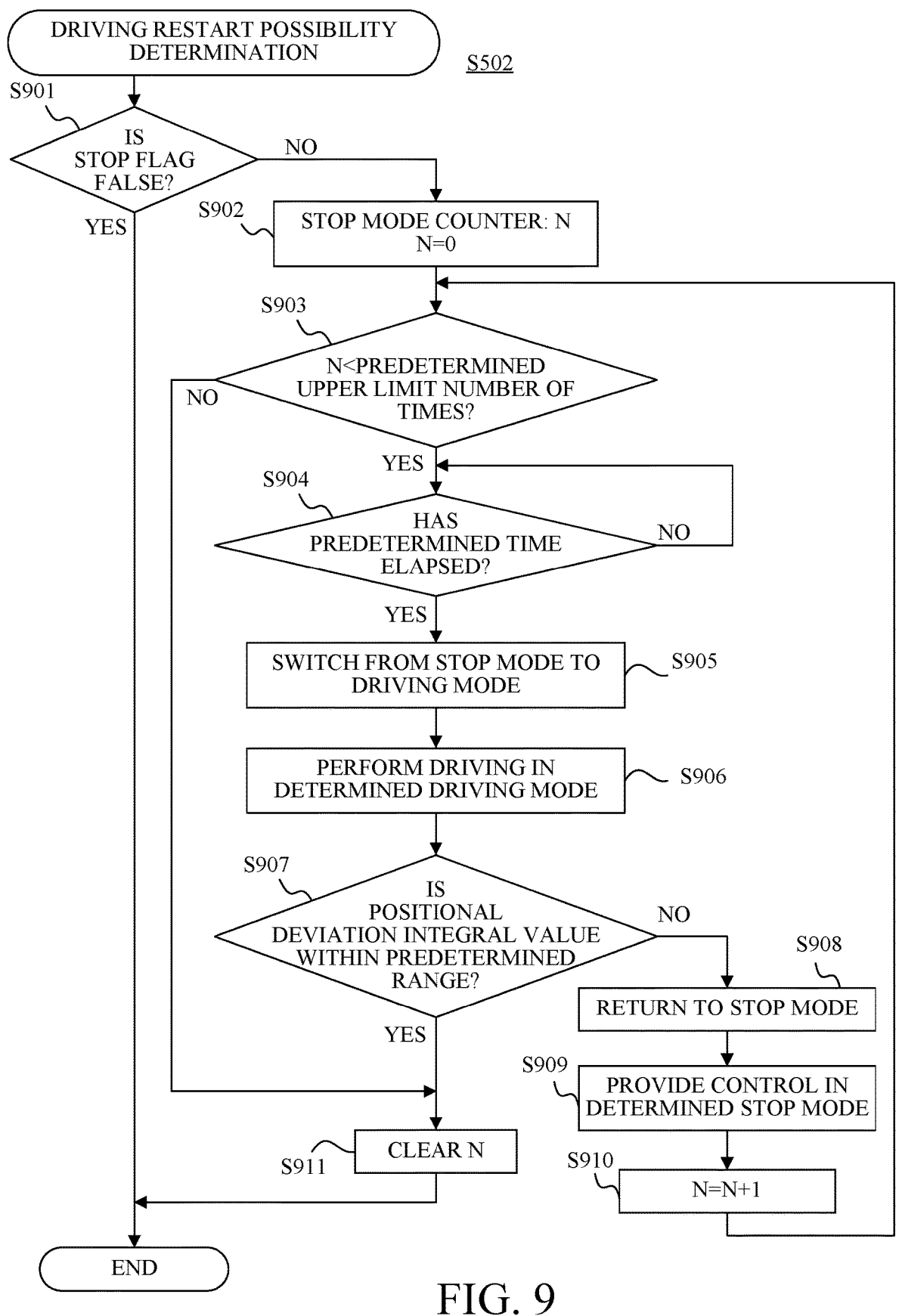
FIG. 9 is a flowchart illustrating driving restart possibility determination processing according to the first embodiment.

Next, a description will be given of the driving restart possibility determination processing of step S502 in FIG. 5, with reference to FIG. 9. FIG. 9 is a flowchart illustrating the driving restart possibility determination processing.

First, in step S901, the driving state determiner 404 determines whether or not the stop flag is FALSE. If the stop flag is FALSE, the driving state determiner 404 determines that the driving controller 407 is driving the movable unit, and this processing ends. On the other hand, if the stop flag is TRUE, the driving state determiner 404 determines that the mode is the stop mode, that is the load reduction mode or the energization off mode, and the process proceeds to step S902. At this time, the current stop mode is stored in the memory 222.

In step S902, if the pressing/twisting operation is continuously performed, the driving state determiner 404 initializes N, where N is a value of a counter counting the number of repetitions of a state in which the stop mode continues. This process may be omitted if the number of repetitions of the stop mode is not counted.

Subsequently, in step S903, the driving state determiner 404 determines whether or not N is less than a predetermined upper limit number of times. If it is determined that N is less than the upper limit number of times, the process proceeds to step S904. The processing in step S903 may also be omitted. In step S904, the driving state determiner 404 measures the time and determines whether or not the pressing/twisting operation is ended after a predetermined time has elapsed since the mode had been switched to the load reduction mode or the energization off mode. Here, the driving state determiner 404 determines whether or not the predetermined time has elapsed since the mode had been switched to the stop mode. If it is determined that the predetermined time has not elapsed since the mode had been switched to the stop mode, step S904 is repeated until the time elapses. On the other hand, if it is determined that the predetermined time has elapsed since the mode had been switched to the stop mode, the process proceeds to step S905. The time used for the determination in step S904 may be set differently between the pressed state and the twisted state.

In step S905, the driving control method determiner 406 determines to switch the mode from the current load reduction mode or energization off mode, i.e., from the current stop mode, to a driving mode, that is, to restart driving, i.e., to perform recovery operation. Subsequently, in step S906, the driving controller 407 transmits a driving instruction to the panning rotation driving controller 221 and starts driving. At this time, the driving is started with a predetermined position as the target position so that a determination is made whether the pressing/twisting operation has been ended.

Subsequently, in step S907, the driving state determiner 404 determines whether or not an absolute value of the time integral value of the deviation between the current position and the target position is within a predetermined range, the absolute value being also referred to as "positional deviation integral value" hereinafter. The value indicating the predetermined range of the time integral value used in the determination may be different from the value in step S601. If the absolute value of the integral value of the positional deviation is within the predetermined range in step S907, the driving state determiner 404 determines that neither the pressing operation nor the twisting operation is performed on the movable unit, and the process proceeds to step S911. On the other hand, if the absolute value of the integral value of the positional deviation is within the predetermined range in step S907, the driving state determiner 404 determines that the pressing operation or the twisting operation is being performed on the movable unit, and the proceeds to step S908. In step S908, the driving control method determiner 406 determines to return to the stop mode, that is the load reduction mode or the energization off mode, which has been stored in the memory 222 at the time of step S901.

Subsequently, in step S909, the driving control method determiner 406 starts control in the determined stop mode. Subsequently, in step S910, the driving state determiner 404 increases N of the counter for the stop mode, and the process returns to step S903. If it is determined in step S907 that the positional deviation integral value is within the predetermined range, or if it is determined in step S903 that N is equal to or larger than the upper limit number of times, the process proceeds to step S911. In step S911, the driving state determiner 404 clears N of the counter for the stop mode. If the number of repetitions of the stop mode is not counted, the processing in step S908 and step S909 may be omitted. When the processing in step S909 is completed, the driving restart possibility determination processing ends.

If it is determined in step S903 that N is equal to or larger than the upper limit number of times, the pressing/twisting operation is being repeated, and therefore the state of the camera 101 may be transmitted to the external apparatus 301 via the communication unit 220. The external apparatus 301 can notify the user that the pressing/twisting state of the camera 101 has been continued for a predetermined time or more.

Figure 10:
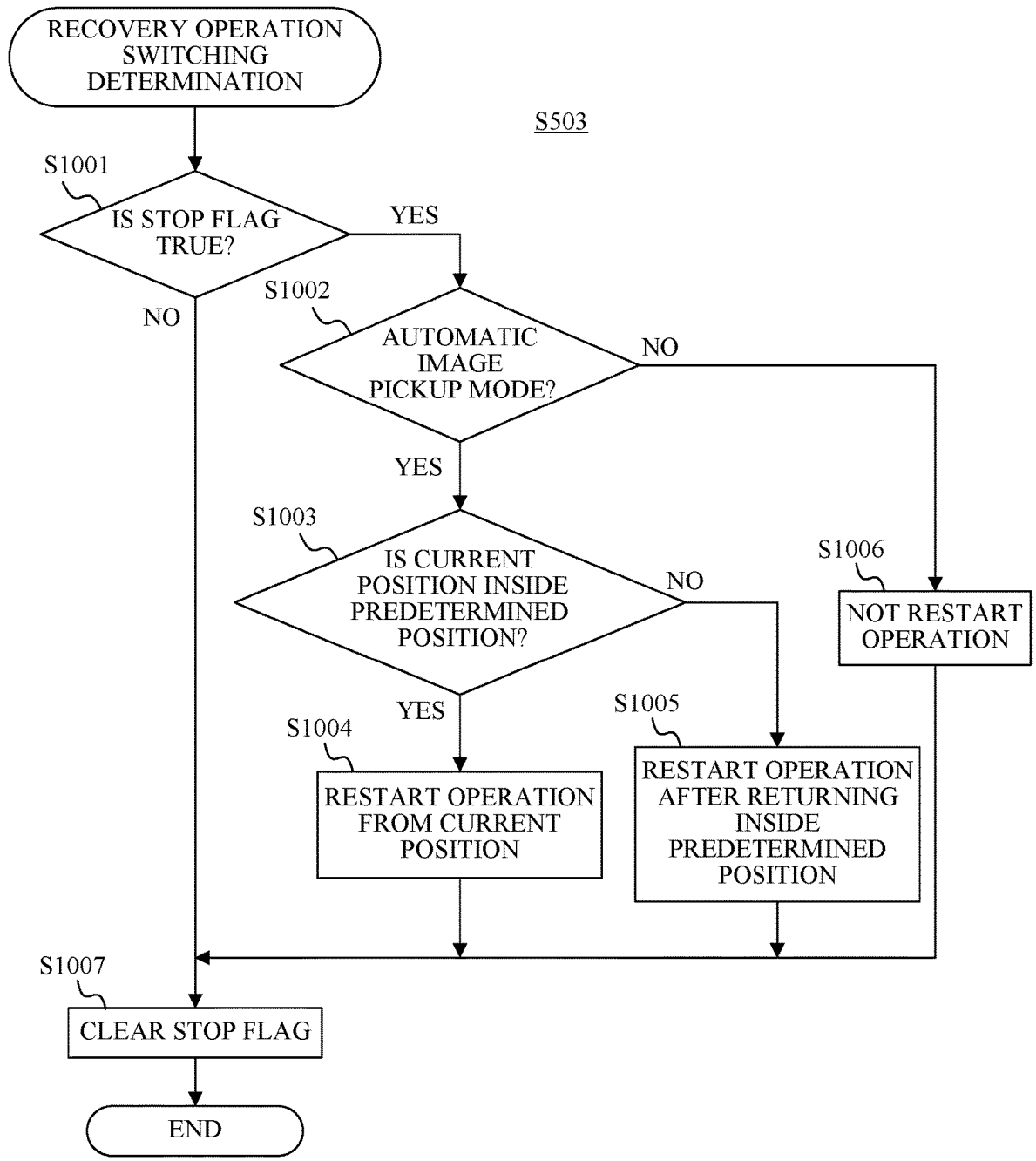
FIG. 10 is a flowchart illustrating recovery operation switching determination processing according to the first embodiment.

Next, a description will be given of the recovery operation switching determination processing of step S503 in FIG. 5, with reference to FIG. 10. FIG. 10 is a flowchart illustrating the recovery operation switching determination processing.

First, in step S1001, the driving state determiner 404 determines, based on the set value of the stop flag, whether driving has continued with pressing/twisting operation not being performed, or the driving has once been interrupted, i.e., whether or not the stop flag is TRUE. If the stop flag is FALSE, it is determined in step S1001 that pressing/twisting operation has not been performed, and the process proceeds to step S1007. In step S1007, the driving state determiner 404 clears the stop flag, and thereafter this processing ends. In this case, since the movable unit has been continuously driven without being interrupted by pressing/twisting operation, it is not necessary to perform restart processing for operation of the movable unit.

On the other hand, if it is determined in step S1001 that the pressing/twisting operation has been performed, the process proceeds to step S1002. In step S1002, the driving state determiner 404 determines whether or not the current image pickup mode is an automatic image pickup mode. Here, the automatic image pickup mode is a mode that automatically performs zooming, panning, and tilting driving for searching for or for tracking an object, determines image pickup timing and object, performs the image pickup operation, and the like. If the pressing/twisting operation has been performed on the movable unit during the automatic image pickup mode, the mode has been switched to the load reduction mode or the energization off mode, and the operation of the automatically driven movable unit has once been interrupted. Since it has been detected in step S502 that the pressing/twisting operation had been ended, the automatic image pickup operation is restarted.

In an image pickup mode which is not the automatic image pickup mode, i.e., a manual image pickup mode, the camera 101 and the external apparatus 301 communicate via the communication unit 220, and the automatic image pickup setting is turned off. The manual image pickup mode is a mode in which the user operates the touch panel, buttons, or the like of the external apparatus 301 to perform the zooming, panning, and tilting driving, presses the image pickup switch SW2, and the like. Alternatively, the above operation may be performed using the button or control wheel of the operation unit 211 of the camera 101.

If it is determined in step S1002 that the automatic image pickup mode is set, the process proceeds to step S1003. In step S1003, the driving controller 407 determines whether or not the current position is inside a predetermined position, i.e., within the predetermined region. Here, the predetermined position refers to an end position which is set in consideration of a margin so that the end of the mechanical member of the movable unit is prevented from being hit, that is, refers to a software limit. If the twisting operation is performed, a final stop position may exceed the software limit. Alternatively, if the user has set a driving range of the movable unit in advance via the external apparatus 301 and the communication unit 220, the end of the driving range may be set as the predetermined position.

If it is determined in step S1003 that the current position is inside the predetermined position, the process proceeds to step S1004. In step S1004, the driving controller 407 controls the panning rotation driving controller 221 to transmit a driving instruction to the panning rotation unit 205, and starts the automatic image pickup processing with normal driving from the current position. On the other hand, if it is determined in step S1003 that the current position is outside the predetermined position, the process proceeds to step S1005. In step S1005, the driving controller 407 performs normal driving to the predetermined position, that is the software limit or the end of the driving range set by the user, or a certain position inside the predetermined position, that is within the predetermined area, and thereafter starts the automatic image pickup processing.

If it is determined in step S1002 that the manual image pickup mode is set, the process proceeds to step S1006. If the pressing/twisting operation is performed during the manual image pickup mode, the operation of the movable unit that has been driven by the user's manual operation is interrupted. In this case, even when it is determined that the pressing/twisting operation has been ended, the operation is not automatically restarted until the driving instruction for the movable unit is received from the user. Thus, the driving is stopped until the driving instruction is received from the user.

If the processing in steps S1004 to S1006 is completed, the process proceeds to step S1007. In step S1007, the driving state determiner 404 clears the stop flag, and step S503 ends. Even in the manual image pickup mode, if the current position exceeds the predetermined position as in step S1003 and the driving start instruction is received from the user, the driving may be started after traveling to the predetermined position.

Second Embodiment

Figure 11:
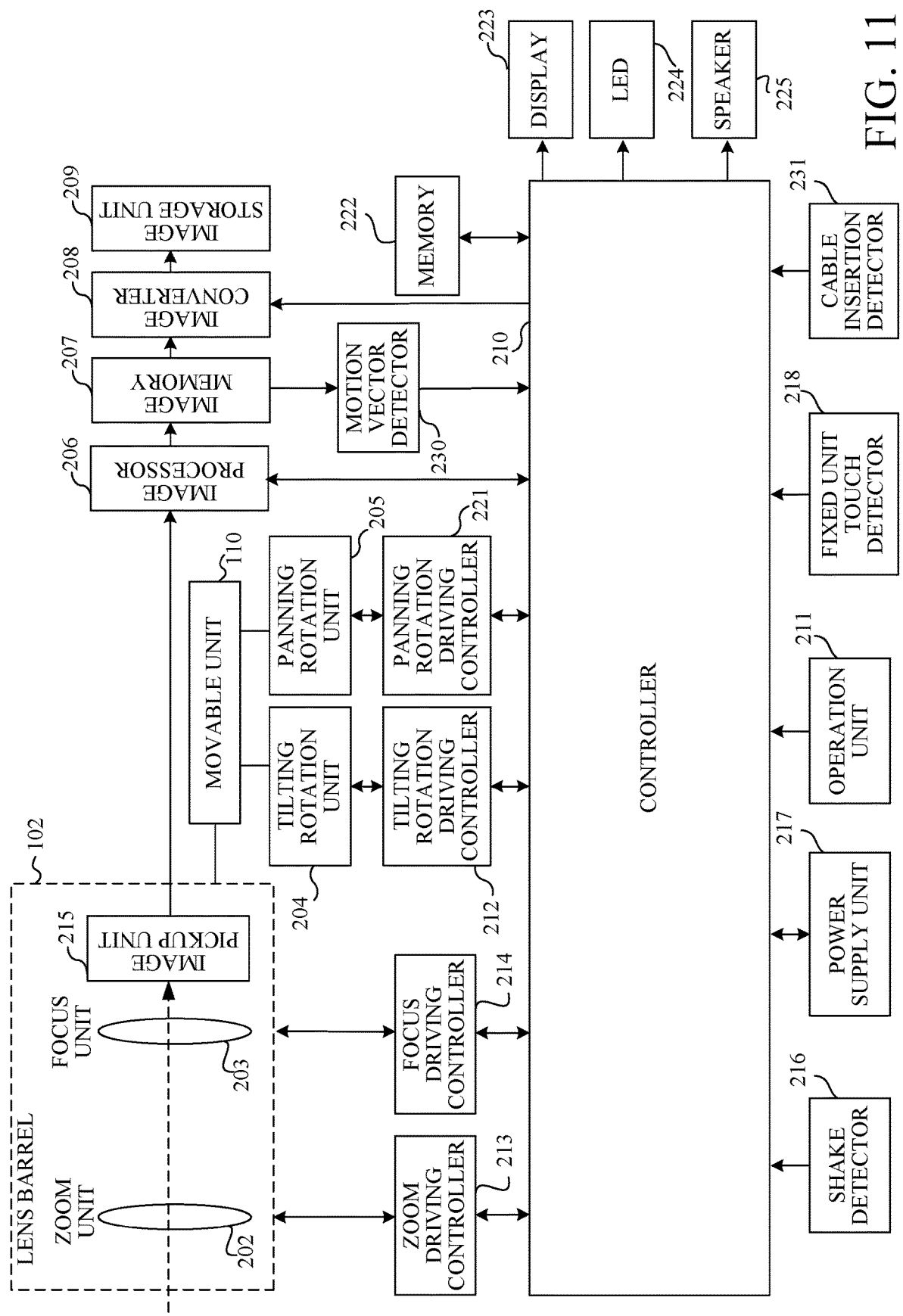
FIG. 11 is a block diagram illustrating the image pickup apparatus according to the second and third embodiments.

FIG. 11 illustrates a configuration of a camera 101 common to second and third embodiments.

Figure 12:
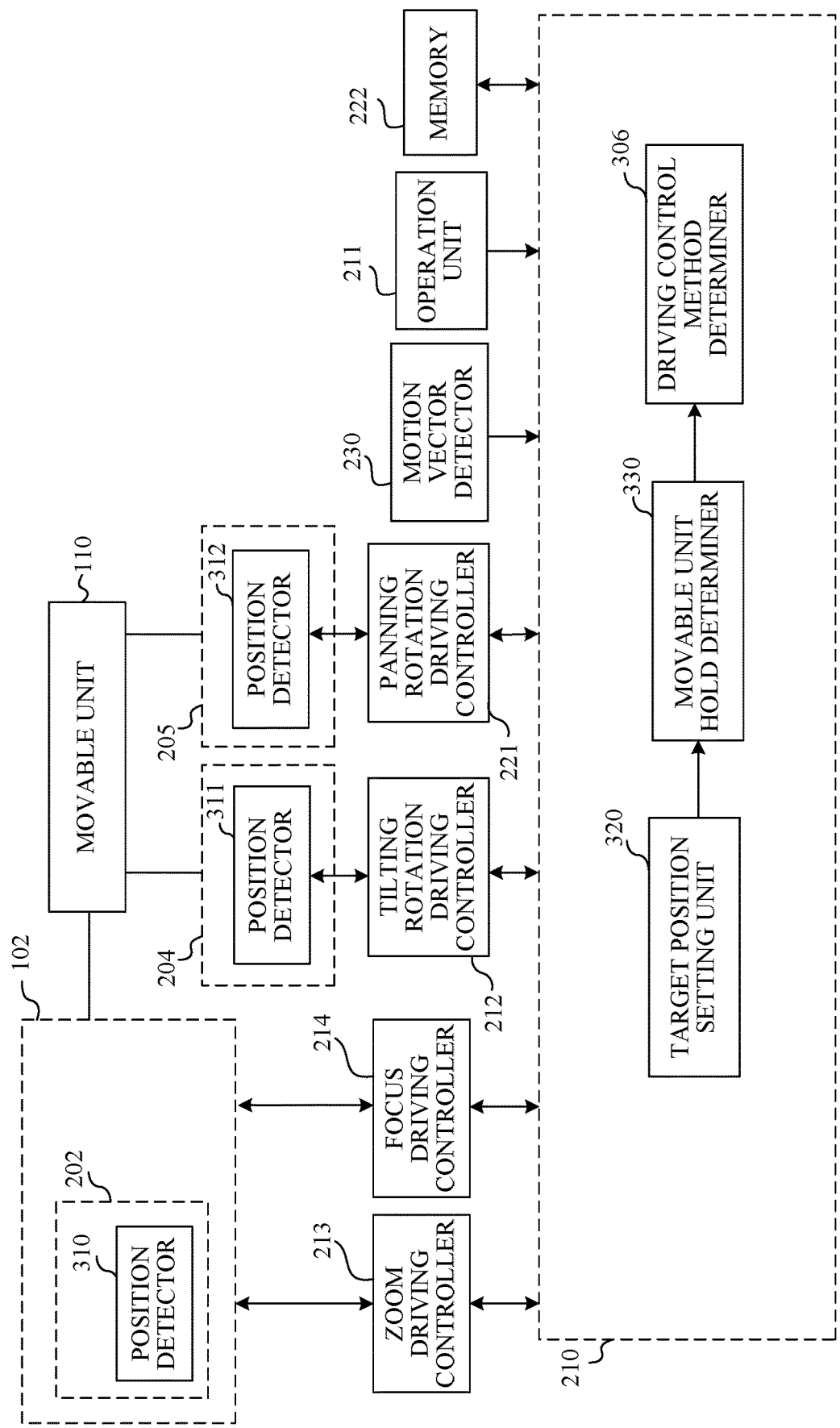
FIG. 12 is a block diagram illustrating a controller according to the second and third embodiments.

FIG. 12 is a block diagram illustrating a configuration of a controller 210 common to the second and third embodiments.

The lens barrel 102 includes an image pickup optical system including a zoom unit 202 and a focus unit 203. The zoom unit 202 includes a zoom lens for magnification variation. A zoom driving controller 213 is configured to drive the zoom unit 202. The focus unit 203 includes a focus lens for focusing. A focus driving controller 214 is configured to drive the focus unit 203. An image pickup unit 215 is configured to receive light that has passed through the image pickup optical system, and to output, as analog image data, information on an electric charge based on an amount of the light to an image processor 206.

The image processor 206 is configured to perform image processing such as distortion correction, white balance adjustment, and color interpolation processing on digital image data that is acquired from A/D conversion on the analog image data, and to output the processed digital image data. The image processor 206 is further configured to convert the digital image data into a video signal (image signal) which is compliant with a format such as NTSC or PAL, and to supply the digital image data to an image memory 207. An image converter 208 is configured to output the image signal stored in the image memory 207, based on an image conversion amount calculated by the controller 210. An image storage unit 209 is a recording medium such as a non-volatile memory, and is configured to record the image signal from the image converter 208.

The motion vector detector 230 as a third detector is configured to detect a motion vector from a plurality of images acquired from the image memory 207.

A tilting rotation driving controller 212 is configured to drive a tilting rotation unit 204. A panning rotation driving controller 221 is configured to drive a panning rotation unit 205. By respectively driving the tilting rotation unit 204 and the panning rotation unit 205, the tilting rotation driving controller 212 and the panning rotation driving controller 221 can rotate a lens barrel 102 connected to a movable unit 110 in a tilting direction and a panning direction.

A shake detector 216 as a second detector is included in a fixed unit 103 and is configured to detect shake or vibration of the camera (image pickup apparatus) 101. The shake detector 216 is, for example, an angular velocity sensor, i.e., a gyro sensor, configured to detect an angular velocity of the camera 101 in three axes directions.

A power supply unit 217 is configured to supply power to each unit in the camera 101.

The controller 210 is configured to control an entire system of the camera 101. The controller 210 is configured to executes, for example, an image pickup program, a movable unit hold determination function program, or the like, each of which is a computer program stored in a memory 222. The controller 210 is also configured to function as a correction unit that corrects the shake detected by the shake detector 216 by rotating the tilting rotation unit 204 and the panning rotation unit 205 via the tilting rotation driving controller 212 and the panning rotation driving controller 221.

The operation unit 211 includes a power button and a button with which a setting of the camera 101 can be changed, and is used by a user to give an instruction to the controller 210. For example, when the power button is operated, power is supplied from the power supply unit 217 to each unit in the camera 101, and the camera 101 is started up.

A display 223 is a liquid crystal display or the like. For example, if the movable unit hold determiner 303 determines that the movable unit 110 is in a held state, a warning message may be displayed on the display 223 so that the user is notified of the state. If it is determined that the movable unit 110 is in the held state, the user may be notified by changing color or blinking pattern of an LED 224 or by emitting voice or beep sound from a speaker 225.

A fixed unit touch detector 218 is a touch sensor or the like, and is configured to notify the controller 210 that an accessory such as a base is attached to the fixed unit 103.

A cable insertion detector 231 is configured to detect that a USB power supply cable or the like has been inserted into a terminal, and to notify the controller 210 of detected information. Specifically, the cable insertion detector 231 is configured to detect that a cable is inserted into the terminal when the terminal of the camera 101 and the terminal of the cable come into contact with each other.

The controller 210 includes a target position setting unit 320 as a setting unit, a movable unit hold determiner 330 as a determination unit, and a driving control method determiner 306.

The target position setting unit 320 is configured to set target positions for the tilting rotation unit 204 and the panning rotation unit 205 by using information acquired from the image processor 206, the operation unit 211, and the like.

A description will be given of a method of setting the target position by using information acquired from the image processor 206. The image processor 206 detects an object by using the image information acquired from the image pickup unit 215. The object is detected by face detection processing or the like. The object information is transmitted to the controller 210. If the object or the user holding the camera 101 moves to a lateral direction, the object may be lost from the angle of view. The tilting rotation unit 204 and the panning rotation unit 205 are rotated so that the image pickup on the object is continued. At that time, the target position setting unit 320 sets the target positions for the tilting rotation unit 204 and the panning rotation unit 205 by using information such as a size and a position of the object on the image information.

A description will be given of a method of setting the target position by using information acquired from the operation unit 211. The target position setting unit 320 sets the target position by using an operation amount on the operation member such as a button and a control wheel, the operation amount being acquired from the operation unit 211. If the object is not captured, the tilting rotation unit 204 and the panning rotation unit 205 are rotated for search for the object. In that case, the target position setting unit 320 sets a predetermined position as the target position.

In order for the tilting rotation unit 204 and the panning rotation unit 205 to reach the target position, feedback control is performed such that the deviation between the target position and the current position is eliminated. In this embodiment, the tilting rotation unit 204 and the panning rotation unit 205 respectively include position detectors (first detector) 311 and 312 each of which is configured to detect the position of the corresponding rotation unit. The zoom unit 202 also includes a position detector 310. Each of the position detectors 310 to 312 includes, for example, an encoder or the like.

The movable unit hold determiner 330 is configured to determine a state of the movable unit 110 by using information on the target position set by the target position setting unit 320 and output signals from the position detectors 311 and 312, i.e., position information on each rotation unit.

The driving control method determiner 306 is configured to determine a driving control method for an actuator in each rotation unit based on the determination result from the movable unit hold determiner 330. The actuator in each rotation unit is driven by driving control executed by each driving controller based on the driving control method determined by the driving control method determiner 306.

Figure 13A:
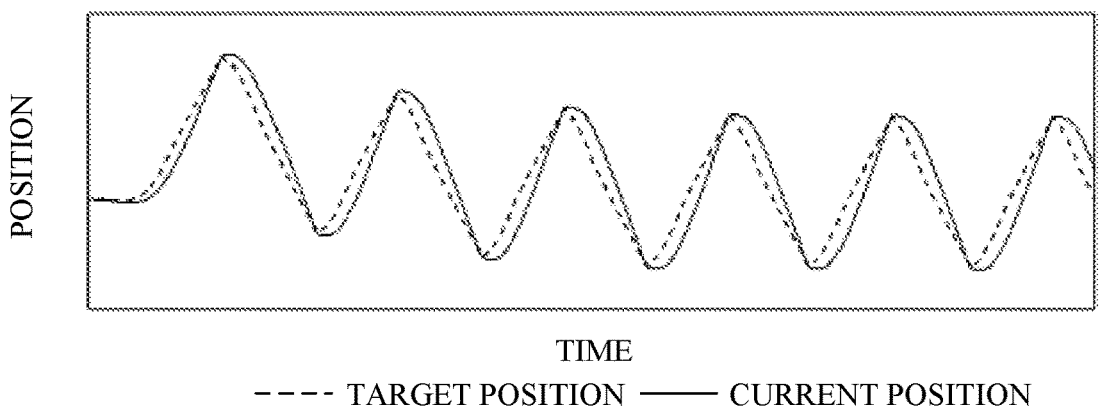
FIGS. 13A to 13C are graphs each describing a change in a position of a panning rotation unit in a state where a movable unit is held according to the second embodiment.
Figure 13B:
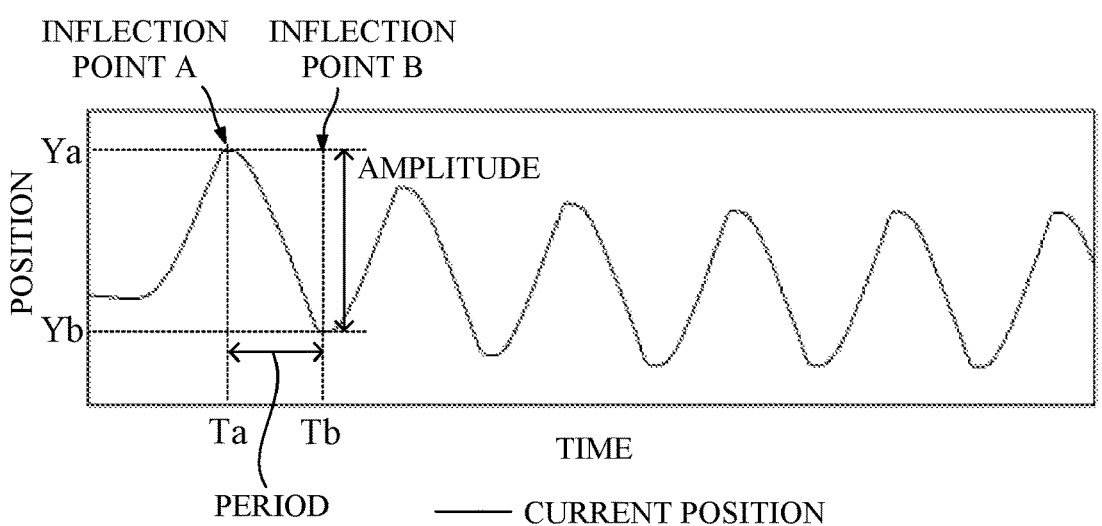
Figure 13C:
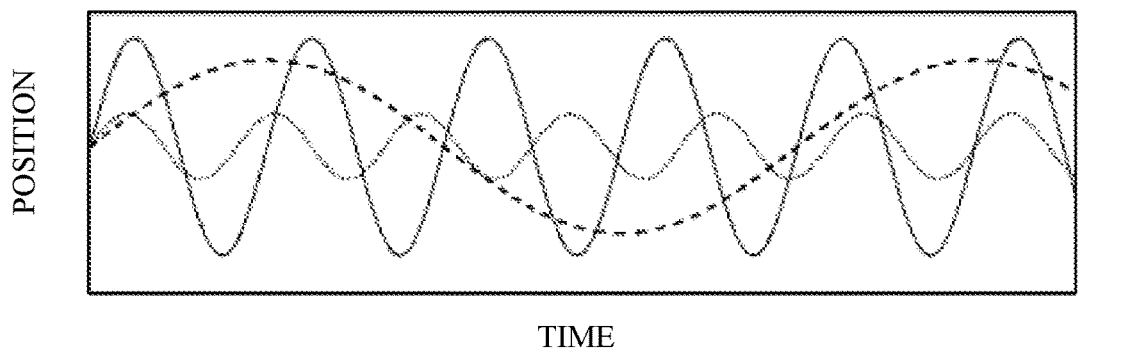

FIGS. 13A to 13C are graphs each illustrating position changes in the panning rotation unit 205 when the movable unit 110 in the second embodiment is in the held state. FIG. 13A illustrates the target position for the panning rotation unit 205 and the output signal from the position detector 312. FIG. 13B is a graph acquired by plotting temporal changes and inflection points of the output signal from the position detector 312. FIG. 13C illustrates the position changes in the panning rotation unit 205 when the movable unit 110 is in the held state or is in a normal state.

In order for the panning rotation unit 205 to reach the target position, the feedback control is performed such that the deviation between the target position and the current position is eliminated. However, if the user holds and lifts the movable unit 110, the shake detector 216 detects the shake in the camera 101. At this time, the panning rotation unit 205 is driven toward the target position set by the target position setting unit 320 so that shake with a panning direction component is cancelled from the detected shakes. However, when the movable unit 110 is being held, the shake generated by driving the panning rotation unit 205 for canceling the shake is transmitted to the shake detector 216, and the panning rotation unit 205 reverses the driving direction and continues driving. That is, as illustrated in FIG. 13A, the target position changes in a sin wave shape, and the position of the panning rotation unit 205 also changes accordingly. In this embodiment, a driving direction in which the current position increases relatively to a reference position of the panning rotation unit 205 is referred to as a forward direction, and a driving direction in which the current position decreases is referred to as a reverse direction.

As illustrated in FIG. 13B, a plurality of inflection points are included in the plotted position changes in the panning rotation unit 205. The inflection points are apexes of the plotted wave. In this embodiment, inflection points A and B refers to two inflection points used in calculating a period and an amplitude of the position change, Ya refers to a position of the inflection point A, Ta refers to time (elapsed time) corresponding to the inflection point A, Yb refers to a position of the inflection point B, and Tb refers to time (elapsed time) corresponding to the inflection point B. In this embodiment, the time Ta is smaller than the time Tb.

In FIG. 13C, a first current position represents the position change in the panning rotation unit 205 when the movable unit 110 is held. A second current position represents the position change in the panning rotation unit 205, caused by image stabilization control when shake caused by walking image pickup or the like is detected. A third current position represents the position change in the panning rotation unit 205, caused by image stabilization when shake caused by camera shake or the like is detected. In this embodiment, the walking image pickup refers to capturing an image while the user is walking, and handheld image pickup refers to capturing an image while the user is standing. The camera shake refers to shake of the user's body transmitted to the camera 101 during the handheld image pickup.

The shake generated by the walking image pickup is a large shake having a large amplitude and period, and thus both the amplitude and the period are large of the position change in the panning rotation unit 205 caused by the shake generated by the walking image pickup. The shake generated by the camera shake is a small shake having a small amplitude and period, both the amplitude and the period are small of the position change in the panning rotation unit 205 caused by the shake generated by the camera shake. On the other hand, the amplitude is large and the period is small in the position change in the panning rotation unit 205 when the movable unit 110 is held. The amplitudes of the position changes in the panning rotation unit 205 may have close values when the image stabilization is performed for the walking image pickup and when the movable unit 110 is in the held state, and the periods of the position changes in the panning rotation unit 205 may have close values when the image stabilization is performed for the camera shake and when the movable unit 110 is in the held state. That is, the combination of the amplitude and the period of the position change in the panning rotation unit 205 when the movable unit 110 is in the held state does not usually occur. Thus, threshold values are set such that the amplitude and the period satisfy predetermined conditions, and thereby it is possible to determine whether or not the movable unit 110 is in the held state. In this embodiment, the movable unit hold determiner 330 determines whether or not the movable unit 110 is held by determining whether or not the amplitude and period acquired by using the plurality of inflection points are larger than the predetermined values.

Figure 14:
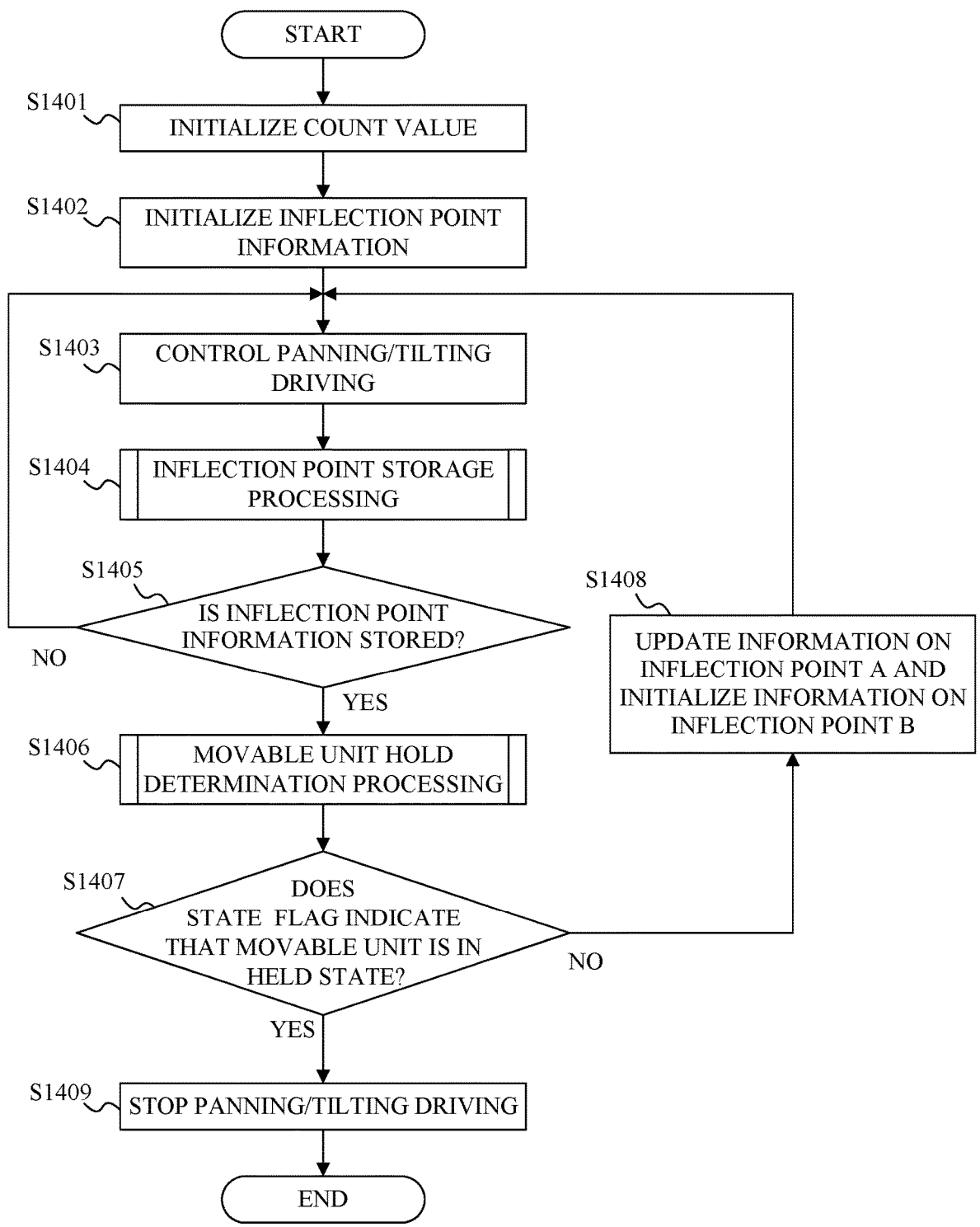
FIG. 14 is a flowchart illustrating a processing by a movable unit hold determination function according to the second embodiment.

Hereinafter, a description will be given of processing by a movable unit hold determination function according to this embodiment, with reference to FIG. 14. FIG. 14 is a flowchart illustrating the processing by the movable unit hold determination function according to this embodiment. In this embodiment, the movable unit hold determination function executes inflection point storage processing and movable unit hold determination processing. The inflection point storage processing is processing for storing information on the positions of inflection points A and B of the position change in the movable unit and on the corresponding time, which is hereinafter referred to as inflection point information. The movable unit hold determination processing is processing for determining whether or not the movable unit 110 is in the held state, by using the period and the amplitude of the position change in the movable unit each of which is based on the inflection point information. Variables used in each processing and the detailed flow will be described later. This embodiment will describe, as an example, operation of the panning rotation unit 205 when the movable unit 110 is held.

In step S1401, the controller 210 initializes a count value used in the movable unit hold determination processing.

In step S1402, the controller 210 initializes the inflection point information.

In step S1403, the controller 210 causes the panning rotation driving controller 221 to perform driving control for making the panning rotation unit 205 reach the target position.

In step S1404, the controller 210 executes the inflection point storage processing.

In step S1405, the controller 210 determines whether or not the inflection point information is stored. If it is determined that the inflection point information is stored, the process proceeds to step S1406, and if not, the process returns to step S1403.

In step S1406, the controller 210 (movable unit hold determiner 330) executes the movable unit hold determination processing. Specifically, the controller 210 determines whether or not the movable unit 110 is in the held state, by using the amplitude and the period each of which is based on the inflection point information.

In step S1407, controller 210 determines whether or not a state flag stored in step S1406 is a flag indicating that the movable unit 110 is in the held state. If the state flag is determined to be the flag indicating that the movable unit 110 is in the held state, the process proceeds to step S1409, and if not, the process proceeds to step S1408.

In step S1408, the controller 210 updates the information on the inflection point A, that is the information on the position of the inflection point A and on the corresponding time, with the information on the inflection point B, that is the information on the position of the inflection point B and on the corresponding time, and initializes the information on the inflection point B.

In step S1409, the controller 210 causes the panning rotation driving controller 221 to stop driving the panning rotation unit 205.

Hereinafter, a description will be given of the inflection point storage processing and the movable unit hold determination processing.

Figure 15:
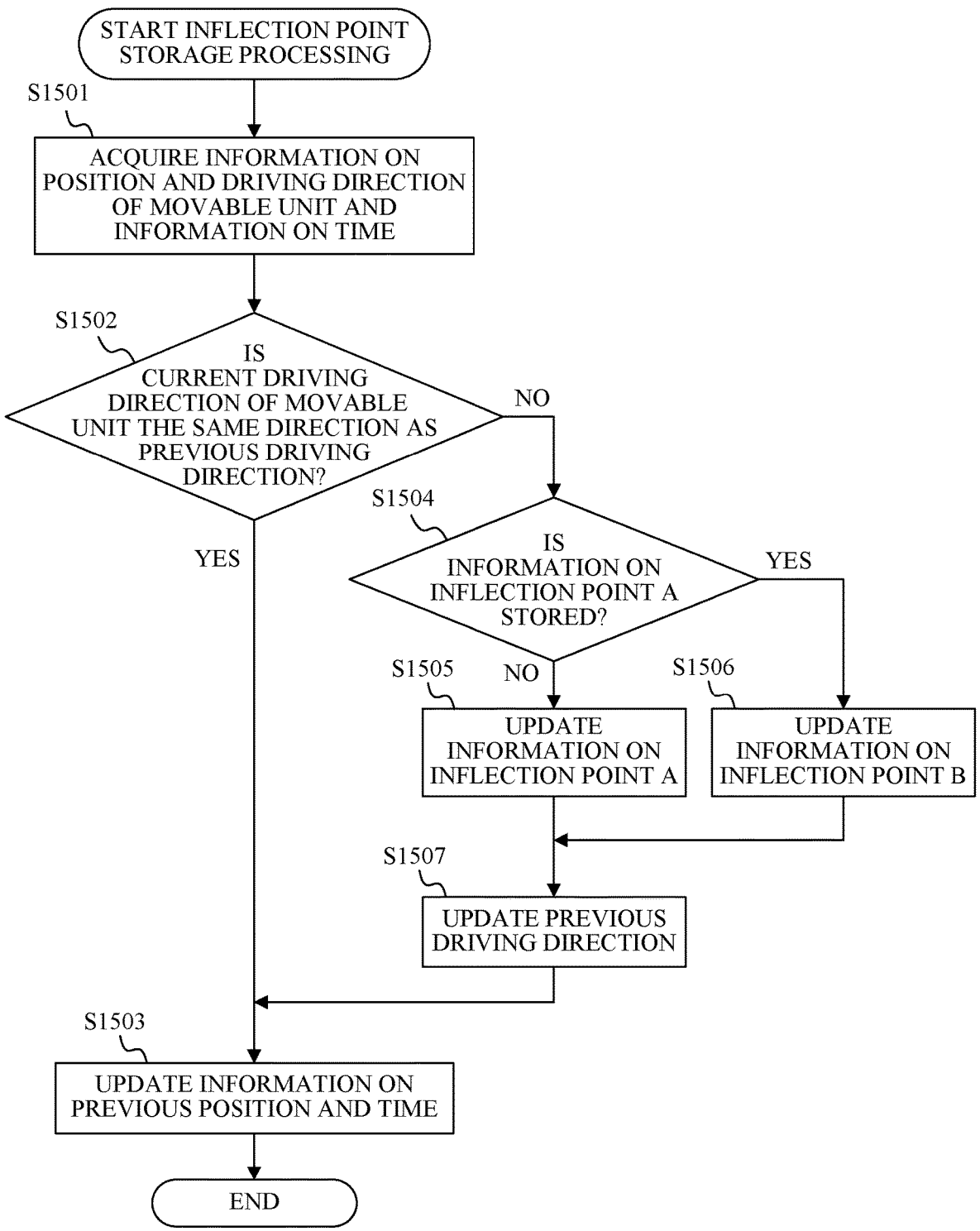
FIG. 15 is a flowchart illustrating inflection point storage processing according to the second embodiment.

First, the inflection point storage processing will be described with reference to FIGS. 13B and 15. FIG. 15 is a flowchart illustrating the inflection point storage processing.

In step S1501, the controller 210 acquires information on the position and the driving direction of the panning rotation unit 205, and information on the time.

In step S1502, the controller 210 determines whether or not a current driving direction of the panning rotation unit 205 is the same direction as a previous driving direction acquired in the last driving cycle. If the current driving direction is the same as the previous driving direction, the process proceeds to step S1503, and if not, the process proceeds to step S1504. The previous driving direction cannot be acquired in first-time processing, and therefore the previous direction is assumed to be the same as the current driving direction in the first-time driving. The determination result that the current driving direction is different from the previous driving direction indicates that the driving direction of the panning rotation unit 205 is reversed.

In step S1503, the controller 210 updates the information on the previous position and time with the information on the position of the panning rotation unit 205 and on the time.

In step S1504, the controller 210 determines whether or not the information on the inflection point A is stored. If the information on the inflection point A is stored, the process proceeds to step S1506, and if not, the process proceeds to step S1505.

In step S1505, the controller 210 stores the previous position Ya and the previous time Ta as the information on the inflection point A.

In step S1506, since the information on the inflection point B is not stored, the controller 210 stores the previous position Yb and the previous time Tb as the information on the inflection point B.

In step S1507, the controller 210 updates the previous driving direction with the current driving direction.

Figure 16:
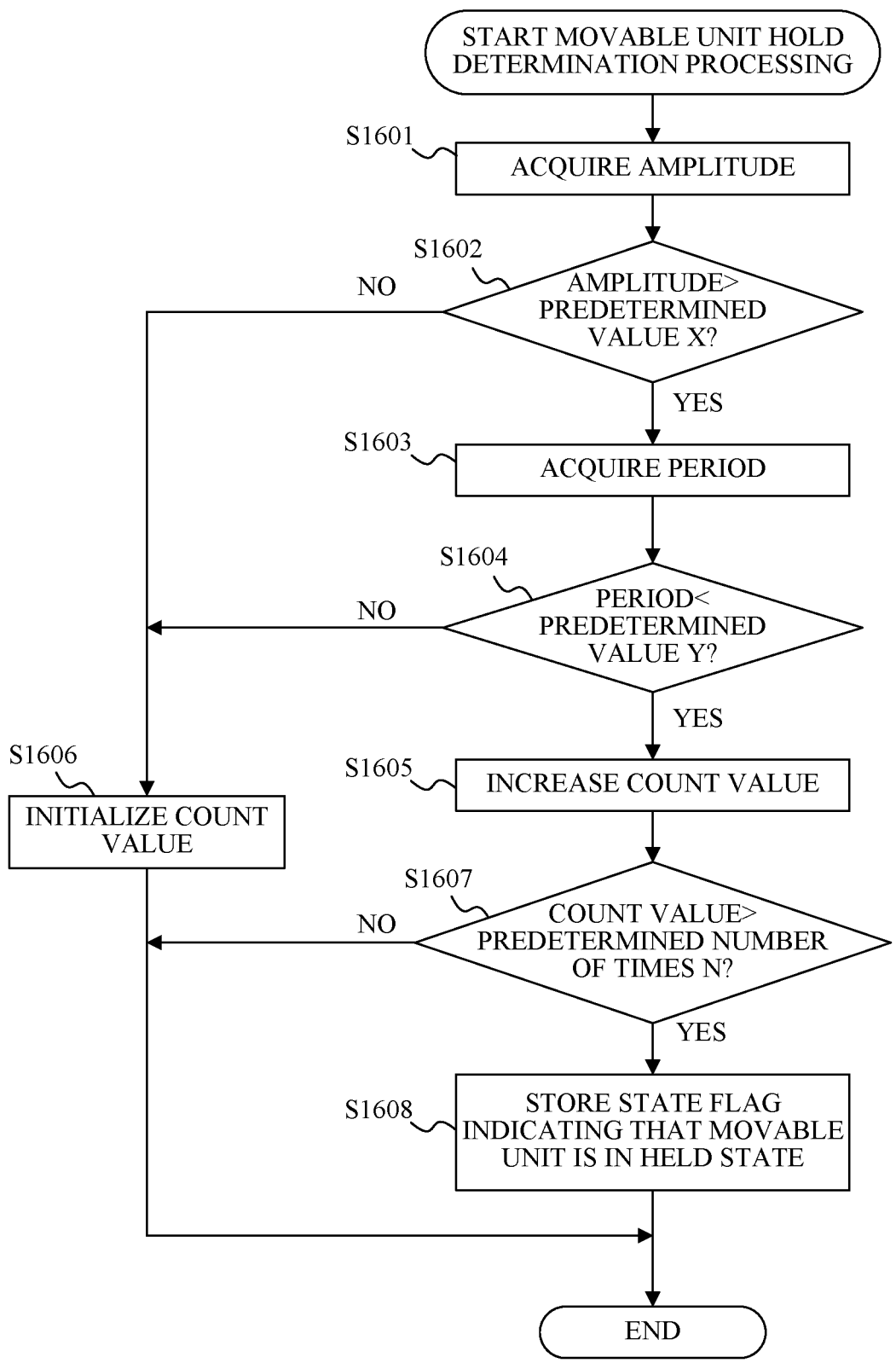
FIG. 16 is a flowchart illustrating movable unit hold determination processing according to the second embodiment.

Next, a description will be given of the movable unit hold determination processing in this embodiment, which is executed by the movable unit hold determiner 330, with reference to FIG. 16. FIG. 16 is a flowchart illustrating the movable unit hold determination processing in this embodiment. In the movable unit hold determination processing, it is determined whether or not the movable unit 110 is in the held state, by using the information on the inflection points A and B stored in the inflection point storage processing.

Here, a description will be given of the count value used in the movable unit hold determination processing. The count value is increased if the period of the position change is smaller than the predetermined value and the amplitude of the position change is larger than the predetermined value. If the count value reaches a predetermined number of times, i.e., if the held state of the movable unit 110 has been continued for a predetermined time, it is determined that the movable unit 110 is in the held state.

In step S1601, the movable unit hold determiner 330 acquires the amplitude based on an absolute value of a positional difference (Ya−Yb) of the inflection points A and B.

In step S1602, the movable unit hold determiner 330 determines whether or not the amplitude acquired in step S1601 is larger than a predetermined value X as a first predetermined value. If the amplitude is larger than the predetermined value X, the process proceeds to step S1603, and if not, the process proceeds to step S1606. It is possible to arbitrarily set which step to proceed when the amplitude is equal to the predetermined value X.

In step S1603, the movable unit hold determiner 330 acquires a period based on a time difference (Tb−Ta) of the inflection points A and B.

In step S1604, the movable unit hold determiner 330 determines whether or not the period acquired in step S1603 is smaller than a predetermined value Y as a second predetermined value. If the period is smaller than the predetermined value Y, the process proceeds to step S1605, and if not, the process proceeds to step S1606. It is possible to arbitrarily set which step to proceed when the period is equal to the predetermined value Y.

In step S1605, the movable unit hold determiner 330 increases the count value, because the amplitude and the period satisfy the condition when the movable unit 110 is held.

In step S1606, the movable unit hold determiner 330 initializes the count value to 0.

In step S1607, the movable unit hold determiner 330 determines whether the count value is larger than the predetermined number of times N. If the count value is larger than the predetermined number of times N, the process proceeds to step S1608, and if not, the movable unit hold determination processing ends. It is possible to arbitrarily set which step to proceed when the count value is equal to the predetermined number of times N.

In step S1608, the movable unit hold determiner 330 stores the state flag indicating that the movable unit 110 is in the held state.

In this embodiment, the determination on the period is made after the determination on the amplitude is made, but the order thereof may be switched.

Hereinafter, a description will be given of a method of setting the predetermined values X and Y each of which is used when the determinations are made on the amplitude and the period in the movable unit hold determination processing.

As described above, the amplitude of the position change in the movable unit in the state where the movable unit 110 is held is larger than the amplitude of the position change in the movable unit caused by the image stabilization control when shake caused by camera shake or the like is detected. The period of the position change in the movable unit when the movable unit 110 is held is smaller than the period of the position change in the movable unit caused by the image stabilization control when shake caused by the walking image pickup or the like is detected. In this embodiment, the predetermined value X is set to the amplitude of the position change in the movable unit caused by the image stabilization control when shake caused by camera shake or the like is detected, and the predetermined value Y is set to the period of the position change in the movable unit caused by image stabilization control when shake caused by walking image pickup or the like is detected.

The predetermined values X and Y may be set by using the position change in the movable unit acquired when the movable unit 110 is actually being held. The predetermined values X and Y may be updated by using the amplitude and the period acquired when the user actually uses the camera 101.

Hereinafter, a description will be given of a method of setting the predetermined number of times N used when the determination is made on the count value in the movable unit hold determination processing. The predetermined number of times N may be set to a suitable number of times based on measurement performed in advance. If it is desired to stop the driving of the movable unit earlier when the movable unit 110 is held, the predetermined number of times N may be set to a small value. If it is desired to notify the user that the movable unit 110 is held by driving the movable unit, the predetermined number of times N may be set to a large value.

If the user can change the on/off of a power saving mode of the camera 101 by using the operation unit 211, the setting of the predetermined number of times N may be changed based on the user operation. For example, N1 may be set as the predetermined number of times when the power saving mode is on, and N2 (>N1) may be set as the predetermined number of times when the power saving mode is off. The setting of the predetermined number of times N may be changed depending on a remaining battery level of the camera 101. For example, when the remaining battery level becomes low, the predetermined number of times N may be set to a small value.

A determination on whether or not the movable unit 110 has been held may be made even when a cable for power supply or for communication is inserted into the terminal provided in the fixed unit 103, or when an accessory such as a base is attached to the fixed unit 103. If the cable is inserted into the terminal, the cable bends when the fixed unit 103 rotates, which may change characteristics of the position change in the movable unit. If the accessory is attached to the fixed unit 103, a weight of the fixed unit 103 is different from when the accessory is not attached, which may change the characteristic of the position change in the movable unit. Thus, the predetermined values X and Y and the predetermined number of times N may be changed if the cable is inserted into the terminal provided in the fixed unit 103 or if the accessory is attached to the fixed unit 103.

The cable insertion detector 231 can detect the insertion of the cable into the terminal. The fixed unit touch detector 218 can detect the attachment of the accessory. When the fixed unit touch detector 218 is not included, for example, if an image is captured while the movable unit is driven with an accessory to be fixed to clothes is attached, the image may include a part of body at a predetermined angle at a close distance. In that case, the attachment of the accessory may be detected by using the image information.

Third Embodiment

In this embodiment, a description will be given of a method for determining whether or not the movable unit 110 is in the held state, which is different from the method described in the second embodiment.

Figure 17:
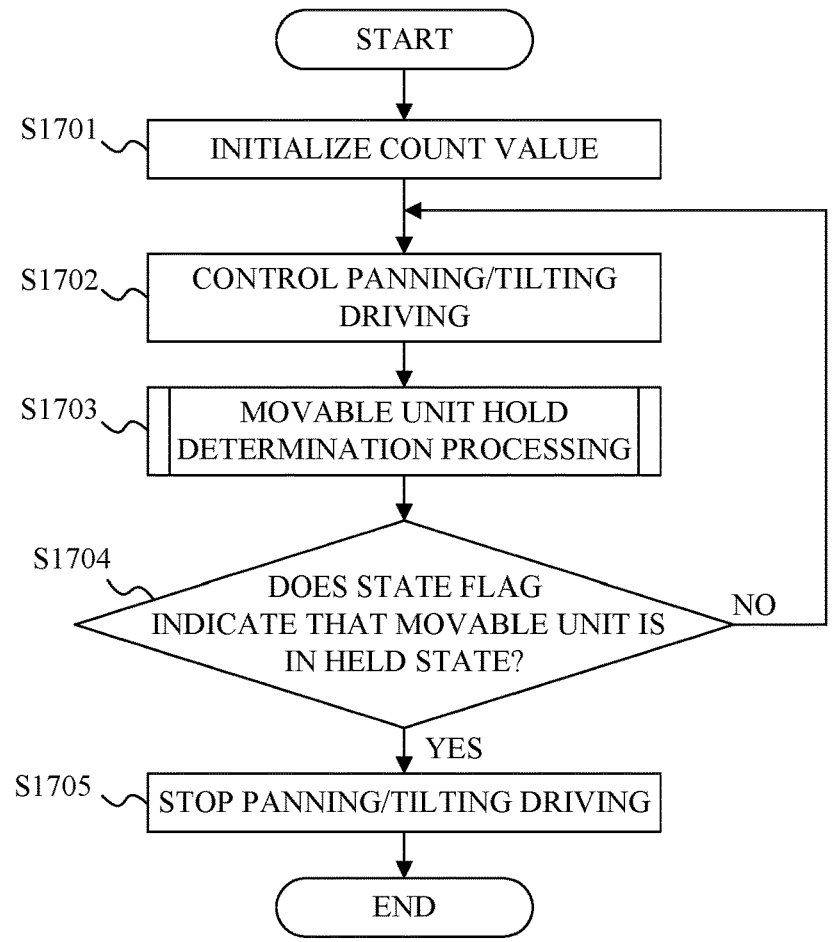
FIG. 17 is a flowchart illustrating processing by a movable unit hold determination function according to the third embodiment.

Hereinafter, the processing will be described of a movable unit hold determination function in this embodiment, with reference to FIG. 17. FIG. 17 is a flowchart illustrating the movable unit hold determination function according to this embodiment. This embodiment will describe operation of the panning rotation unit 205 as the movable unit, as in the second embodiment.

In step S1701, the controller 210 initializes the count value used in movable unit hold determination processing.

In step S1702, the controller 210 causes the panning rotation driving controller 221 to perform driving control for making the panning rotation unit 205 reach the target position.

In step S1703, the controller 210 (movable unit hold determiner 330) executes the movable unit hold determination processing. Specifically, the controller 210 determines whether or not the movable unit 110 is in the held state, by using the deviation between the target position and the current position of the panning rotation unit 205 and a motion vector of the object calculated from a plurality of images.

In step S1704, the controller 210 determines whether or not a state flag stored in step S1703 is a flag indicating that the movable unit 110 is in the held state. If the state flag is determined to be the flag indicating that the movable unit 110 is in the held state, the process proceeds to step S1705, and if not, the process returns to step S1702.

In step S1705, the controller 210 causes the panning rotation driving controller 221 to stop driving the panning rotation unit 205.

Hereinafter, a description will be given for the movable unit hold determination processing which uses position information on the movable unit and image information.

Figure 18:
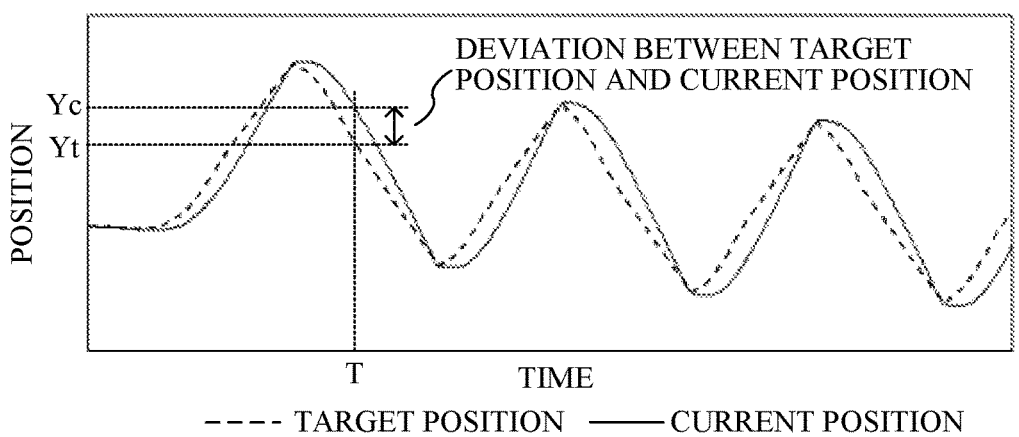
FIG. 18 is a graph describing a deviation between a target position and a current position of a panning rotation operation unit in a state where a movable unit is held according to the third embodiment.

FIG. 18 is a graph illustrating a deviation between a target position Yt and a current position Yc of the panning rotation unit 205 at time T when the movable unit 110 is held. As described in the second embodiment, when the movable unit 110 is held, the panning rotation unit 205 continues driving while reversing a driving direction. Hence, as illustrated in FIG. 18, the deviation between the target position Yt and the current position Yc becomes equal to or larger than a predetermined value.

Figure 19A:
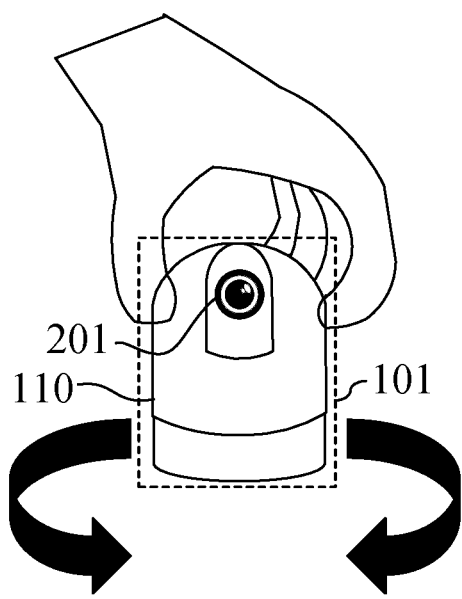
FIGS. 19A to 19B are diagrams each illustrating a state in which the image pickup apparatus is held and rotated in a panning direction according to the third embodiment.
Figure 19B:
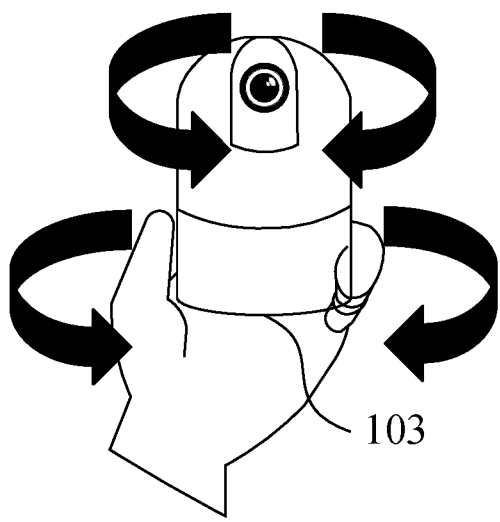

Hereinafter, a description will be given of motion of the movable unit 110 when the user holds the camera 101 with reference to FIGS. 19A and 19B. Each of FIGS. 19A and 19B is a diagram illustrating a state in which the camera 101 is held and rotated in the panning direction. FIGS. 19A and 19B illustrate a state in which the movable unit 110 is held, and a state in which the fixed unit 103 is held, respectively. If shake in the panning direction is intentionally given in the state illustrated in FIG. 19B, the panning rotation unit 205 is driven while the driving direction is reversed toward the target position so that the shake is cancelled. In this case, the object will be blurred unless image stabilization control is performed. Therefore, whether the movable unit 110 is in the held state or the fixed unit 103 is held is determined, and to switch the driving control.

A description will be given of motion vectors detected in the states illustrated in FIGS. 19A and 19B. If the movable unit 110 is held by hand, the image may include blur caused by shake transmitted from the user's hand. On the other hand, if the fixed unit 103 is held and rotated, the panning rotation unit 205 rotates so as to cancel the shake. Thus, when the fixed unit 103 is held and rotated, as compared with when the movable unit 110 is held and rotated, a direction of the lens barrel 102 greatly changes with the motion of the movable unit 110, and therefore, the motion vector of the object becomes equal to or larger than a predetermined value.

Figure 20:
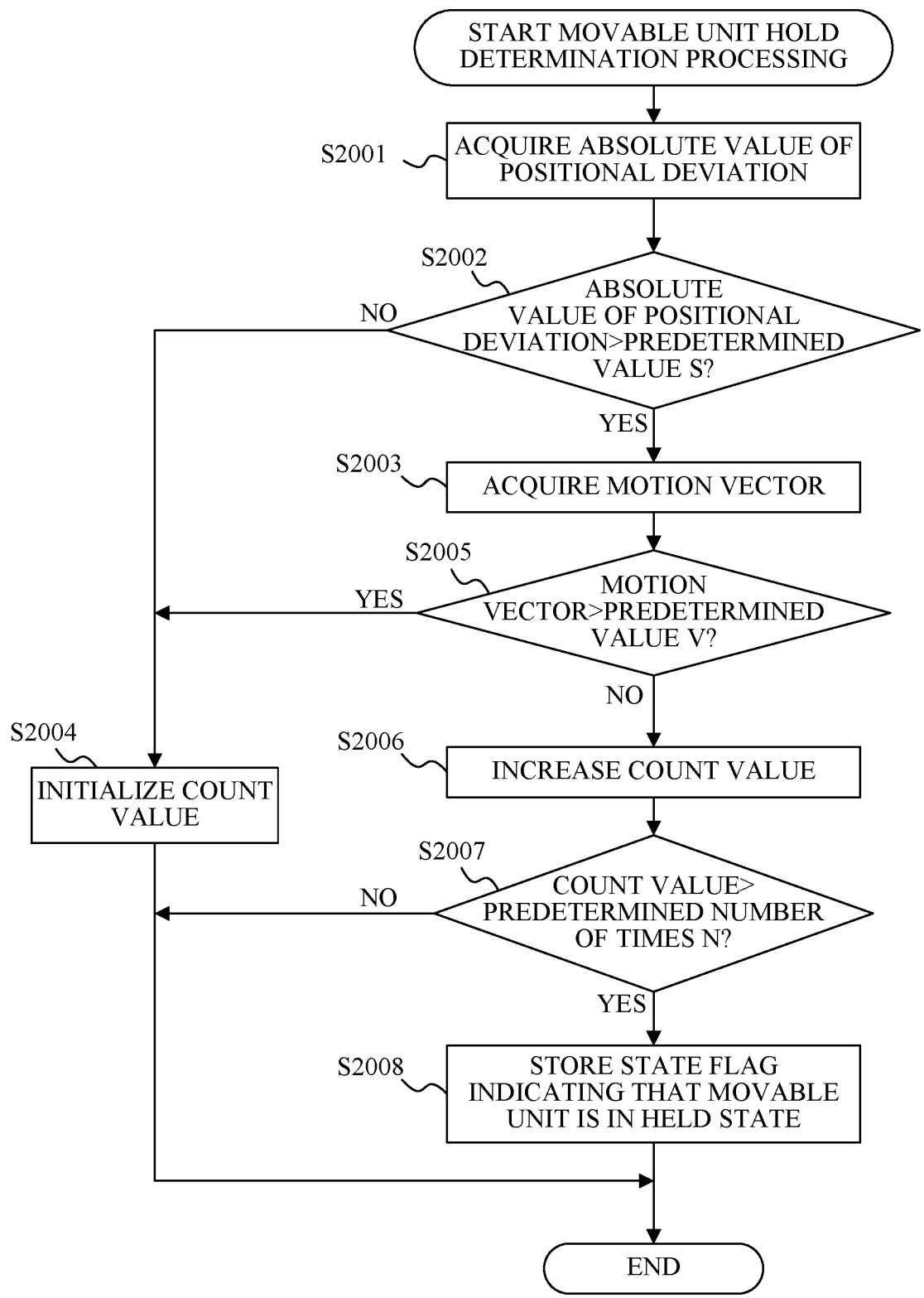
FIG. 20 is a flowchart illustrating movable unit hold determination processing according to the third embodiment.

Hereinafter, a description will be given of the movable unit hold determination processing executed by the movable unit hold determiner 330 with reference to FIG. 20. FIG. 20 is a flowchart illustrating the movable unit hold determination processing according to this embodiment.

In step S2001, the movable unit hold determiner 330 acquires an absolute value of a positional deviation (Yc−Yt) between the target position and the current position of the rotation of the panning rotation unit 205 at time T.

In step S2002, the movable unit hold determiner 330 determines whether or not the absolute value of the positional deviation acquired in step S2001 is larger than a predetermined value S as a third predetermined value. If the absolute value of the positional deviation is larger than the predetermined value S, the process proceeds to step S2003. If the absolute value of the positional deviation is smaller than the predetermined value S, the process proceeds to step S2004. It is possible to arbitrarily set which step to proceed when the absolute value of the positional deviation is equal to the predetermined value S.

In step S2003, the movable unit hold determiner 330 acquires a motion vector from the motion vector detector 230. The motion vector detector 230 calculates a motion vector by using two or more pieces of image information on a current frame and on the last frame acquired from the image memory 207. At this time, the object for which the motion vector is to be acquired may be either an image pickup object or an object which has been automatically recognized to be identical in the plurality of images from features such as color and shape.

In step S2004, the movable unit hold determiner 330 initializes the count value to 0.

In step S2005, the movable unit hold determiner 330 determines whether or not the motion vector acquired in step S2003 is larger than a predetermined value V as a fourth predetermined value. If the motion vector is smaller than the predetermined value V, the process proceeds to step S2006, and if not, the process proceeds to step S2004. It is possible to arbitrarily set which step to proceed when the motion vector is equal to the predetermined value V.

In step S2006, the movable unit hold determiner 330 increases the count value.

In step S2007, the movable unit hold determiner 330 determines whether or not the count value is larger than the predetermined number of times N. If the count value is larger than the predetermined number of times N, the process proceeds to step S2008, and if not, the movable unit hold determination processing ends. It may be arbitrarily set which step to proceed when the count value is equal to the predetermined number of times N.

In step S2008, the movable unit hold determiner 330 stores the state flag indicating that the movable unit 110 is in the held state.

Each embodiment has described the method of using the position change in the panning rotation unit 205, but the same effect can be acquired by using the position change in the tilting rotation unit 204.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

As described above, a control apparatus (210) includes a driving control unit (driving controller 407), a determination unit (pressing/twisting determiner 403), and a decision unit (driving control method determiner 406). The driving control unit is configured to control driving of a movable unit. The determination unit is configured to determine a state in which the movable unit is pressed or twisted. The decision unit is configured to set the driving control unit to a first stop mode if the determination unit determines that the movable unit is in a pressed state, and to set the driving control unit to a second stop mode if the determination unit determines that the movable unit is in a twisted state.

A control apparatus includes a first decision unit (target position determiner 402), a first determination unit (driving state determiner 404), a second determination unit (abnormal factor determiner 405), a second decision unit (driving control method determiner 406), and a driving control unit. The driving control unit is configured to control driving of a movable unit. The first decision unit is configured to determine a target position of the movable unit. The first determination unit is configured to determine a control state of the movable unit based on whether or not a control amount of the driving control unit is within a predetermined range, the control amount being calculated based on the target position and a current position of the movable unit. The second determination unit is configured to determine whether or not a current velocity of the movable unit is larger than a threshold value, if the first determination unit determines that the control amount is not within the predetermined range. The second decision unit is configured to set the driving control unit to a first stop mode if the second determination unit determines that the current velocity is larger than the threshold value, and to set the driving control unit to a second stop mode if the second determination unit determines that the current velocity is not larger than the threshold value.

The control amount may be based on an integral value of a positional deviation between the target position and the current position. The control amount may be based on the integral value of the positional deviation between the target position and the current position and on a differential value of the positional deviation. When the driving control unit controls the movable unit in the first stop mode or the second stop mode, if the first determination unit determines that the control amount is within the predetermined range, the driving control unit may restart driving of the movable unit from the first stop mode or the second stop mode.

The driving control unit may have, as image pickup modes, an automatic image pickup mode for automatically executing image pickup based on the object information and a manual image pickup mode for executing image pickup based on an instruction from a user. When driving of the movable unit is to be restarted from the first stop mode or the second stop mode, the driving control unit may switch operation of the movable unit based on the image pickup mode and the current position.

If the automatic image pickup mode is set and the current position is within a predetermined area, the driving control unit may restart the operation of the movable unit from the current position. If the automatic image pickup mode is set and the current position is not within the predetermined area, the driving control unit may restart the operation of the movable unit after moving the movable unit to a predetermined position. If the manual image pickup mode is set, the driving control unit may not restart the operation of the movable unit until an instruction is given by the user.

The above configuration can provide a control apparatus, an image pickup apparatus, a control method, and a memory medium each of which can properly control a panning mechanism and a tilting mechanism even if operation of the movable unit is hindered.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application Nos. 2020-084267, filed on May 13, 2020, and 2020-170291, filed on Oct. 8, 2020, which are hereby incorporated by reference herein in their entirety.

What is claimed is:

1. An apparatus comprising:
    at least one processor; and
    at least one memory coupled to the processor storing instructions that, when executed by the processor, cause the processor to function as:
        a control unit configured to control driving of a movable unit;
        a determination unit configured to determine whether the movable unit is in a first state or a second state; and
        a decision unit configured to set the control unit to a first stop mode if the movable unit is in the first state, and to set the control unit to a second stop mode if the movable unit is in the second state,
    wherein the first state is a state in which the movable unit is pressed by a user pressing the movable unit, and
    wherein the second state is a state in which the movable unit is twisted by the user forcibly moving the movable unit,
    wherein the determination unit determines:
        the movable unit is in the second state in a case where a control amount of the control unit calculated based on a target position and a current position of the movable unit is not within a predetermined range and a current velocity of the movable unit is larger than a threshold value, and
        the movable unit is in the first state in a case where the control amount is not within the predetermined range and the current velocity is not larger than the threshold value.

2. The apparatus according to claim 1, wherein the movable unit includes a vibration actuator,
    wherein the control unit is configured to control the driving of the movable unit by applying a plurality of cyclic voltage waveforms having different phases to the vibration actuator,
    wherein in the first stop mode, the control unit is configured to apply a cyclic voltage waveform having a same phase to the vibration actuator, and
    wherein in the second stop mode, the control unit is configured to stop energization for the vibration actuator.

3. The apparatus according to claim 2, wherein a control amount of the control unit is based on an integral value of a positional deviation between a target position and a current position of the movable unit.

4. The apparatus according to claim 2, wherein a control amount of the control unit is based on an integral value of a positional deviation between a target position and a current position of the movable unit, and on a differential value of the positional deviation.

5. The apparatus according to claim 1, further comprising a detection unit configured to detect object information,
    wherein the control unit has, as pickup modes, an automatic pickup mode for automatically executing image pickup based on the object information and a manual pickup mode for executing image pickup based on an instruction from a user, and
    wherein when driving of the movable unit is to be restarted from the first stop mode or the second stop mode, the control unit switches operation of the movable unit based on the pickup mode and a current position of the movable unit.

6. The apparatus according to claim 5, wherein if the automatic pickup mode is set and the current position is within a predetermined area, the control unit restarts the operation of the movable unit from the current position,
    wherein if the automatic pickup mode is set and the current position is not within the predetermined area, the control unit restarts the operation of the movable unit after moving the movable unit to a predetermined position, and
    wherein if the manual pickup mode is set, the driving control unit does not restart the operation of the movable unit until an instruction is given by the user.

7. A pickup apparatus comprising:
    a sensor; and
    an apparatus including:
        at least one processor; and at least one memory coupled to the processor storing instructions that, when executed by the processor, cause the processor to function as:
a control unit configured to control driving of a movable unit;
a determination unit configured to determine whether the movable unit is in a first state or a second state; and
a decision unit configured to set the control unit to a first stop mode if the movable unit is in the first state, and to set the control unit to a second stop mode if the movable unit is in the second state,
wherein the first state is a state in which the movable unit is pressed by a user pressing the movable unit, and
wherein the second state is a state in which the movable unit is twisted by the user forcibly moving the movable unit,
wherein the determination unit determines:
the movable unit is in the second state in a case where a control amount of the control unit calculated based on a target position and a current position of the movable unit is not within a predetermined range and a current velocity of the movable unit is larger than a threshold value, and
the movable unit is in the first state in a case where the control amount is not within the predetermined range and the current velocity is not larger than the threshold value.

8. The pickup apparatus according to claim 7, further comprising a fixed unit,
wherein the movable unit is configured to rotate a lens barrel with respect to the fixed unit in a first direction and in a second direction that is different from the first direction.

9. A non-transitory computer-readable storage medium storing a computer program that causes a computer to execute a method, the method comprising:
controlling driving of a movable unit by a control unit;
determining whether the movable unit is in a first state or a second state; and
setting control during the controlling driving to a first stop mode if the movable unit is in the first state, and setting the control during the controlling driving to a second stop mode if the movable unit is in the second state,
wherein the first state is a state in which the movable unit is pressed by a user pressing the movable unit, and
wherein the second state is a state in which the movable unit is twisted by the user forcibly moving the movable unit,
wherein it is determined that the movable unit is in the second state in a case where a control amount of the control unit calculated based on a target position and a current position of the movable unit is not within a predetermined range and a current velocity of the movable unit is larger than a threshold value, and
wherein it is determined that the movable unit is in the first state in a case where the control amount is not within the predetermined range and the current velocity is not larger than the threshold value.

* * * * *